(12) United States Patent
Sato et al.

(10) Patent No.: US 10,615,839 B2
(45) Date of Patent: Apr. 7, 2020

(54) HIGH-FREQUENCY-SIGNAL TRANSCEIVER CIRCUIT

(71) Applicant: Murata Manufacturing Co., Ltd., Kyoto (JP)

(72) Inventors: Tsuyoshi Sato, Kyoto (JP); Hidetoshi Matsumoto, Kyoto (JP); Kiichiro Takenaka, Kyoto (JP); Masahiro Ito, Kyoto (JP); Satoshi Tanaka, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/267,691

(22) Filed: Feb. 5, 2019

(65) Prior Publication Data

US 2019/0253096 A1 Aug. 15, 2019

(30) Foreign Application Priority Data

Feb. 13, 2018 (JP) ................. 2018-023357
Dec. 12, 2018 (JP) ................. 2018-232594

(51) Int. Cl.
 *H04B 1/40* (2015.01)
 *H04B 1/00* (2006.01)

(52) U.S. Cl.
 CPC .............. *H04B 1/40* (2013.01); *H04B 1/006* (2013.01); *H04B 1/0057* (2013.01); *H04B 1/0064* (2013.01); *H04B 1/0067* (2013.01)

(58) Field of Classification Search
 CPC .......... H04B 1/40; H04B 1/00; H04B 1/0057; H04B 1/0067; H04B 1/006; H04B 7/024; H04B 7/04; H04B 7/0404; H04B 7/0413; H04B 10/118; H04B 7/0452; H04B 7/02; H04B 7/0495; H04B 7/204; H04B 7/2043; H04B 7/2045; H04B 7/2046; H04B 7/208; H04B 7/212; H04B 1/401; H04B 1/48; H04B 1/50; H04W 88/00; H04W 88/02; H04W 88/08; H04W 88/06; H04W 64/00; H04W 74/02; H04W 5/22; H04W 88/10; H04L 5/00; H04J 7/00; H04J 11/003; H04M 1/78; H04M 9/022; H04M 9/025; H04M 9/027
See application file for complete search history.

(56) References Cited

U.S. PATENT DOCUMENTS

| 6,473,410 | B1 * | 10/2002 | Sakoda et al. ................ 370/330 |
| 9,543,661 | B2 * | 1/2017 | Lee et al. ............. H01Q 21/065 |
| 9,867,194 | B2 * | 1/2018 | Kadous et al. ..... H04W 72/048 |
| 2007/0190954 | A1 * | 8/2007 | Murakami et al. ........... 455/132 |
| 2008/0084838 | A1 * | 4/2008 | Ryoo et al. .................... 370/316 |
| 2008/0137560 | A1 * | 6/2008 | Totsuka et al. ............... 370/276 |
| 2009/0128254 | A1 * | 5/2009 | Goi et al. ...................... 333/101 |

(Continued)

*Primary Examiner* — Meless N Zewdu
(74) *Attorney, Agent, or Firm* — Pearne & Gordon LLP

(57) ABSTRACT

First to fourth circuits are connected to corresponding first to fourth antenna terminals. The first to fourth circuits transmit and receive a signal of TDD and a signal of FDD. The first to fourth circuits transmit and receive a signal of MIMO. The third circuit receives a signal of a satellite positioning system. The lower limit of the frequency of the signal received by the third circuit and the fourth circuit is higher than the lower limit of the frequency of the signal received by the first circuit and the second circuit.

15 Claims, 19 Drawing Sheets

(56) References Cited

U.S. PATENT DOCUMENTS

| | | |
|---|---|---|
| 2011/0081876 A1* | 4/2011 | Kuehn et al. ................. 455/103 |
| 2011/0250926 A1* | 10/2011 | Wietfeldt et al. ............. 455/525 |
| 2012/0127922 A1* | 5/2012 | Feher ........................... 370/320 |
| 2015/0333563 A1* | 11/2015 | Rofougaran et al. ... H02J 7/025 |
| 2017/0251474 A1 | 8/2017 | Khlat et al. |
| 2018/0019833 A1* | 1/2018 | Okuda .................... H04J 3/247 |
| 2018/0041944 A1* | 2/2018 | Korneluk et al. .... H04W 48/16 |
| 2019/0158154 A1* | 5/2019 | Na ....................... H04B 7/0404 |

\* cited by examiner

HIGH-FREQUENCY-SIGNAL TRANSCEIVER CIRCUIT

This application claims priority from Japanese Patent Application No. 2018-023357 filed on Feb. 13, 2018, and claims priority from Japanese Patent Application No. 2018-232594 filed on Dec. 12, 2018. The content of these applications are incorporated herein by reference in their entireties.

BACKGROUND OF THE DISCLOSURE

1. Field of the Disclosure

The present disclosure relates to a high-frequency-signal transceiver circuit.

2. Description of the Related Art

In a mobile communication device such as a cellular phone device or a smart phone, a front-end circuit is disposed between an antenna and a RFIC (Radio Frequency Integrated Circuit).

A radio-frequency front-end circuit is disclosed in U.S. Patent Application Publication No. 2017/0251474.

BRIEF SUMMARY OF THE DISCLOSURE

Currently, third generation mobile communication systems (for example, W-CDMA, UMTS, and CDMA2000 1×) and fourth generation mobile communication systems (for example, LTE (Long Term Evolution) and LTE-Advanced) are utilized.

In a 3GPP TSG RAN Plenary (Third Generation Partnership Project, Technical Specification Group, Radio Access Network Plenary) meeting in December 2017, the first edition of a 5G NR (New Radio) standard specification was completed. As a result, mobile communication devices compliant with 5G NR (also referred below to as "5GNR") are presumably developed.

Consequently, there is a need for front-end circuits that are disposed between antennas and 5GNR RFICs. The coexistence with existing communication systems is a prerequisite of the front-end circuits. That is, it is necessary for mobile communication devices such as smart phones to be equipped with plural communication systems, and the size of the front-end circuits needs to be decreased.

The present disclosure has been accomplished in view of the above description, and an object of the present disclosure is to decrease the size.

According to preferred embodiments of the present disclosure, a high-frequency-signal transceiver circuit transmits and receives a signal between first to fourth antenna terminals and terminals connected to a high-frequency circuit. The high-frequency-signal transceiver circuit includes first to fourth circuits connected to the corresponding first to fourth antenna terminals. The first to fourth circuits transmit and receive a signal of time division multiplexing communication and a signal of frequency division multiplexing communication. The first to fourth circuits transmit and receive a signal of multiple-input and multiple-output communication. The third circuit receives a signal of a satellite positioning system. A lower limit of a frequency of the signal received by the third circuit and the fourth circuit is higher than a lower limit of a frequency of the signal received by the first circuit and the second circuit.

According to preferred embodiments of the present disclosure, a high-frequency-signal transceiver circuit transmits and receives a signal between first to fourth antenna terminals and terminals connected to a high-frequency circuit. The high-frequency-signal transceiver circuit includes a first circuit that transmits and receives a signal of time division multiplexing communication via the first to fourth antenna terminals, and a second circuit that receives a signal of a satellite positioning system via the third antenna terminal.

According to preferred embodiments of the present disclosure, the size can be decreased.

Other features, elements, characteristics and advantages of the present disclosure will become more apparent from the following detailed description of preferred embodiments of the present disclosure with reference to the attached drawings.

DETAILED DESCRIPTION OF THE DISCLOSURE

High-frequency-signal transceiver circuits according to embodiments of the present disclosure will hereinafter be described in detail with reference to the drawings. The present disclosure is not limited to the embodiments. The embodiments will be described by way of examples. It goes without saying that the features described according to the different embodiments can be partially replaced or combined.

First Embodiment

Figure 1:
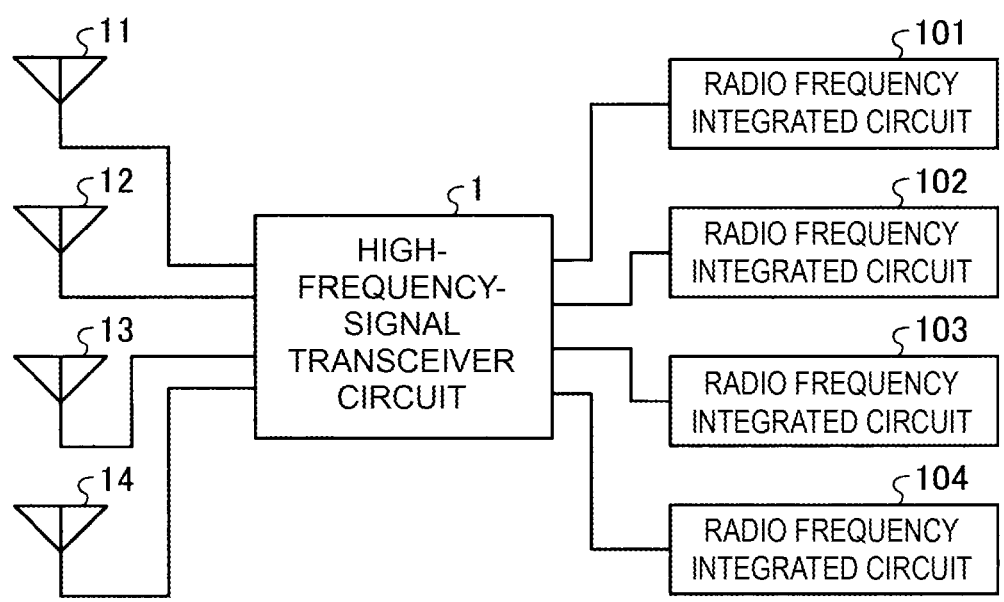
FIG. 1 illustrates a circuit including a high-frequency-signal transceiver circuit according to a first embodiment.

FIG. 1 illustrates a circuit including a high-frequency-signal transceiver circuit according to a first embodiment. A high-frequency-signal transceiver circuit 1 is a front-end circuit that is disposed between a first antenna 11 to a fourth antenna 14 and radio frequency integrated circuits (RFICs) 101 to 104 in a mobile communication device such as a cellular phone device or a smart phone. In the following description, the radio frequency integrated circuits 101 to 104 are referred to as the RFICs 101 to 104.

The RFIC 101 transmits and receives a LTE (Long Term Evolution) high-frequency signal. The RFIC 102 transmits and receives a 5GNR high-frequency signal. The RFIC 103 transmits and receives a WiFi (IEEE (The Institute of Electrical and Electronics Engineers, Inc.) 802.11) high-frequency signal. The RFIC 104 transmits and receives a GPS (Global Positioning System) high-frequency signal. The RFICs 101 to 104 may be integrated into a single radio frequency integrated circuit.

The RFICs 101 to 104 correspond to a "high-frequency circuit" according to the present disclosure.

Figure 2:
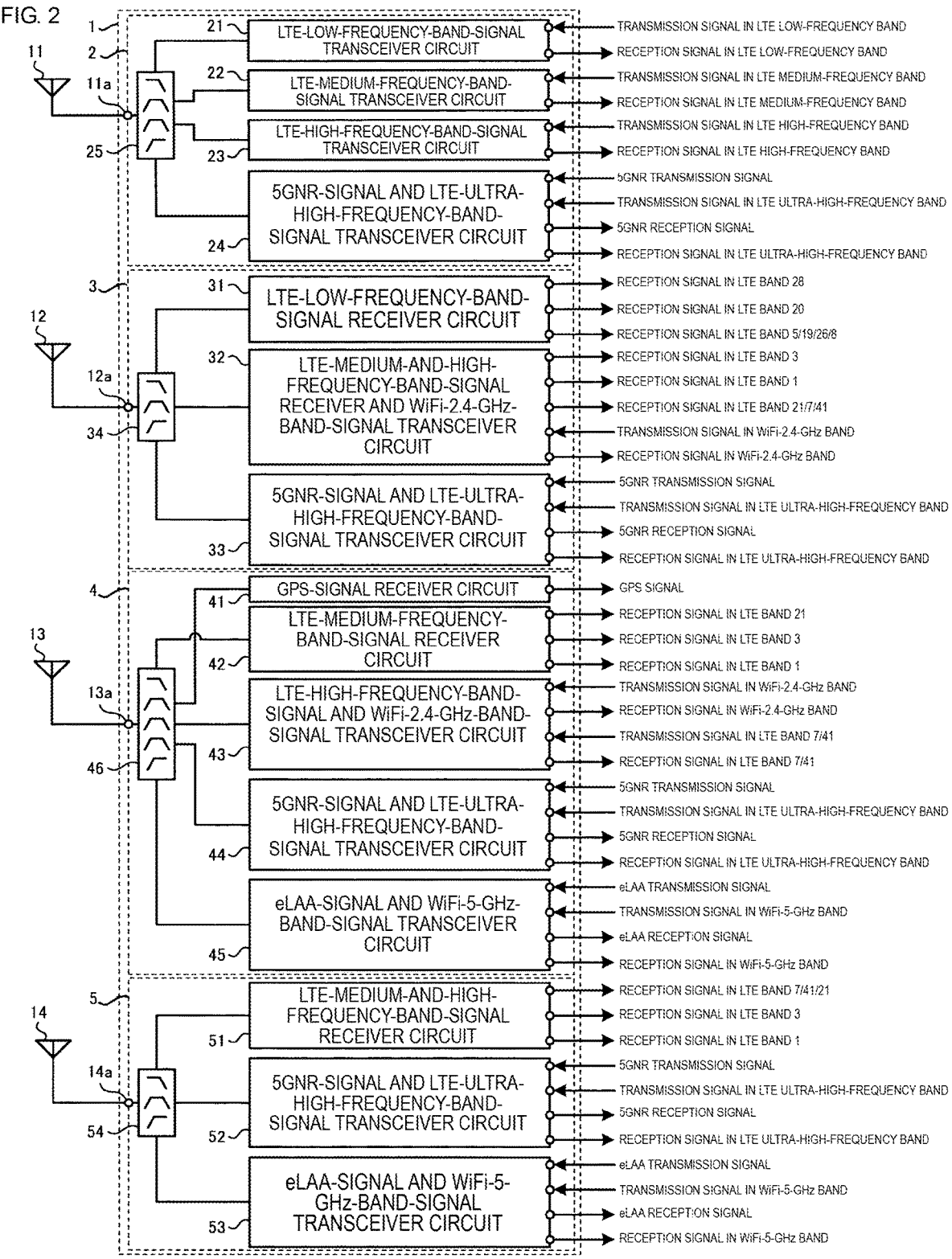
FIG. 2 illustrates the structure of the high-frequency-signal transceiver circuit according to the first embodiment.

FIG. 2 illustrates the structure of the high-frequency-signal transceiver circuit according to the first embodiment. The high-frequency-signal transceiver circuit 1 can be formed on another integrated circuit (IC) that differs from the RFICs 101 to 104, and the integrated circuit (IC) can be mounted on a printed circuit board. A first antenna terminal 11a to a fourth antenna terminal 14a may be disposed on the printed circuit board. The first antenna 11 to the fourth antenna 14 may be mounted on the printed circuit board. The RFICs 101 to 104 may be mounted on the printed circuit board.

The high-frequency-signal transceiver circuit 1 includes a first circuit 2 that transmits and receives a high-frequency signal between the first antenna terminal 11a and terminals connected to the RFICs 101 and 102.

The high-frequency-signal transceiver circuit 1 includes a second circuit 3 that transmits and receives a high-frequency signal between the second antenna terminal 12a and terminals connected to the RFICs 101, 102, and 103.

The high-frequency-signal transceiver circuit 1 includes a third circuit 4 that transmits and receives a high-frequency signal between the third antenna terminal 13a, and terminals connected to the RFICs 101 to 104. The third circuit 4 may be capable of transmitting and receiving a high-frequency signal between the third antenna terminal 13a and a RFIC of a satellite positioning system such as GLONASS, Galileo, the BeiDou satellite positioning system, or the quasi-zenith satellite system.

The high-frequency-signal transceiver circuit 1 includes a fourth circuit 5 that transmits and receives a high-frequency signal between the fourth antenna terminal 14a and terminals connected to the RFICs 101 to 103.

The first circuit 2 includes a LTE-low-frequency-band-signal transceiver circuit 21, a LTE-medium-frequency-band-signal transceiver circuit 22, a LTE-high-frequency-band-signal transceiver circuit 23, a 5GNR-signal and LTE-ultra-high-frequency-band-signal transceiver circuit 24, and a multiplexer 25.

According to the first embodiment, each transceiver circuit may be divided into a transmitter circuit and a receiver circuit.

According to the first embodiment, a LTE low-frequency band includes LTE bands 28, 20, 5, 19, 26, and 8. The present disclosure, however, is not limited thereto.

The LTE band 28 is used for frequency division multiplexing communication (Frequency Division Duplex, or FDD) in which an uplink (transmission) frequency ranges from about 703 MHz to about 748 MHz, and a downlink (reception) frequency ranges from about 758 MHz to about 803 MHz.

The LTE band 20 is used for FDD in which the transmission frequency ranges from about 832 MHz to about 862 MHz, and the reception frequency ranges from about 791 MHz to about 821 MHz.

The LTE band 5 is used for FDD in which the transmission frequency ranges from about 824 MHz to about 849 MHz, and the reception frequency ranges from about 869 MHz to about 894 MHz.

The LTE band 19 is used for FDD in which the transmission frequency ranges from about 830 MHz to about 845 MHz, and the reception frequency ranges from about 875 MHz to about 890 MHz.

The LTE band 26 is used for FDD in which the transmission frequency ranges from about 814 MHz to about 849 MHz, and the reception frequency ranges from about 859 MHz to about 894 MHz.

The LTE band 8 is used for FDD in which the transmission frequency ranges from about 880 MHz to about 915 MHz, and the reception frequency ranges from about 925 MHz to about 960 MHz.

According to the first embodiment, a LTE medium-frequency band includes LTE bands 21, 3, and 1. The present disclosure, however, is not limited thereto.

The LTE band 21 is used for FDD in which the transmission frequency ranges from about 1447.9 MHz to about 1462.9 MHz, and the reception frequency ranges from about 1495.9 MHz to about 1510.9 MHz.

The LTE band 3 is used for FDD in which the transmission frequency ranges from about 1710 MHz to about 1785 MHz, and the reception frequency ranges from about 1805 MHz to about 1880 MHz.

The LTE band 1 is used for FDD in which the transmission frequency ranges from about 1920 MHz to about 1980 MHz, and the reception frequency ranges from about 2110 MHz to about 2170 MHz.

According to the first embodiment, a LTE high-frequency band includes LTE bands 7 and 41. The present disclosure, however, is not limited thereto.

The LTE band 7 is used for FDD in which the transmission frequency ranges from about 2500 MHz to about 2570 MHz, and the reception frequency ranges from about 2620 MHz to about 2690 MHz.

The LTE band 41 is used for time division multiplexing communication (Time Division Duplex, or TDD) in which the transmission and reception frequencies range from about 2496 MHz to about 2690 MHz.

According to the first embodiment, a LTE ultra-high-frequency band includes a LTE band 42. The present disclosure, however, is not limited thereto.

The LTE band 42 is used for TDD in which the transmission and reception frequencies range from about 3400 MHz to about 3600 MHz.

According to the first embodiment, a 5GNR includes TDD in a 3.5 GHz band including about 3.3 GHz to about 4.2 GHz, a 3.5 GHz band including about 3.3 GHz to about 3.8 GHz, and a 4.5 GHz band including about 4.5 GHz to about 4.99 GHz. The present disclosure, however, is not limited thereto.

The multiplexer 25 is a 1-to-4 quadplexer. The multiplexer 25 electrically connects the first antenna terminal 11a and circuits such as the LTE-low-frequency-band-signal transceiver circuit 21, the LTE-medium-frequency-band-signal transceiver circuit 22, the LTE-high-frequency-band-signal transceiver circuit 23, and the 5GNR-signal and LTE-ultra-high-frequency-band-signal transceiver circuit 24 to each other.

The multiplexer 25 includes a low pass filter, a first band pass filter, a second band pass filter, and a high pass filter. The low pass filter passes a signal in the LTE low-frequency band. The first band pass filter passes a signal in the LTE medium-frequency band. The second band pass filter passes a signal in the LTE high-frequency band. The high pass filter passes a 5GNR signal and a signal in the LTE ultra-high-frequency band.

The LTE-low-frequency-band-signal transceiver circuit 21 receives a transmission signal in the LTE low-frequency band from the RFIC 101 and outputs the signal to the first antenna terminal 11a via the low pass filter of the multiplexer 25. The LTE-low-frequency-band-signal transceiver circuit 21 receives a reception signal in the LTE low-frequency band from the first antenna terminal 11a via the low pass filter of the multiplexer 25 and outputs the signal to the RFIC 101.

The LTE-medium-frequency-band-signal transceiver circuit 22 receives a transmission signal in the LTE medium-frequency band from the RFIC 101 and outputs the signal to the first antenna terminal 11a via the first band pass filter of the multiplexer 25. The LTE-medium-frequency-band-signal transceiver circuit 22 receives a reception signal in the LTE medium-frequency band from the first antenna terminal 11a via the first band pass filter of the multiplexer 25 and outputs the signal to the RFIC 101.

The LTE-high-frequency-band-signal transceiver circuit 23 receives a transmission signal in the LTE high-frequency band from the RFIC 101 and outputs the signal to the first antenna terminal 11a via the second band pass filter of the multiplexer 25. The LTE-high-frequency-band-signal transceiver circuit 23 receives a reception signal in the LTE high-frequency band from the first antenna terminal 11a via the second band pass filter of the multiplexer 25 and outputs the signal to the RFIC 101.

The 5GNR-signal and LTE-ultra-high-frequency-band-signal transceiver circuit 24 receives a 5GNR transmission signal from the RFIC 102 and outputs the signal to the first antenna terminal 11a via the high pass filter of the multiplexer 25. The 5GNR-signal and LTE-ultra-high-frequency-band-signal transceiver circuit 24 receives a transmission signal in the LTE ultra-high-frequency band from the RFIC 101 and outputs the signal to the first antenna terminal 11a via the high pass filter of the multiplexer 25.

The 5GNR-signal and LTE-ultra-high-frequency-band-signal transceiver circuit 24 receives a 5GNR reception signal from the first antenna terminal 11a via the high pass filter of the multiplexer 25 and outputs the signal to the RFIC 102. The 5GNR-signal and LTE-ultra-high-frequency-band-signal transceiver circuit 24 receives a reception signal in the LTE ultra-high-frequency band from the first antenna terminal 11a via the high pass filter of the multiplexer 25 and outputs the signal to the RFIC 101.

The second circuit 3 includes a LTE-low-frequency-band-signal receiver circuit 31, a LTE-medium-and-high-frequency-band-signal receiver and WiFi-2.4-GHz-band-signal transceiver circuit 32, a 5GNR-signal and LTE-ultra-high-frequency-band-signal transceiver circuit 33, and a multiplexer 34.

The multiplexer 34 is a 1-to-3 triplexer. The multiplexer 34 electrically connects the second antenna terminal 12a and circuits such as the LTE-low-frequency-band-signal receiver circuit 31, the LTE-medium-and-high-frequency-band-signal receiver and WiFi-2.4-GHz-band-signal transceiver circuit 32, and the 5GNR-signal and LTE-ultra-high-frequency-band-signal transceiver circuit 33 to each other.

A WiFi-2.4-GHz band includes CSMA/CA (Carrier Sense Multiple Access with Collision Avoidance) the center frequency of which ranges from about 2412 MHz to about 2484 MHz. The present disclosure, however, is not limited thereto.

The multiplexer 34 includes a low pass filter, a band pass filter, and a high pass filter. The low pass filter passes a signal in the LTE low-frequency band. The band pass filter passes a signal in the LTE medium-and-high-frequency band and a signal in the WiFi-2.4-GHz band. The high pass filter passes a 5GNR signal and a signal in the LTE ultra-high-frequency band.

The LTE-low-frequency-band-signal receiver circuit 31 receives a reception signal in the LTE low-frequency band from the second antenna terminal 12a via the low pass filter of the multiplexer 34 and outputs the signal to the RFIC 101.

The LTE-medium-and-high-frequency-band-signal receiver and WiFi-2.4-GHz-band-signal transceiver circuit 32 receives a reception signal in the LTE medium-and-high-frequency band from the second antenna terminal 12a via the band pass filter of the multiplexer 34 and outputs the signal to the RFIC 101.

The LTE-medium-and-high-frequency-band-signal receiver and WiFi-2.4-GHz-band-signal transceiver circuit 32 receives a transmission signal in the WiFi-2.4-GHz band from the RFIC 103 and outputs the signal to the second antenna terminal 12a via the band pass filter of the multiplexer 34. The LTE-medium-and-high-frequency-band-signal receiver and WiFi-2.4-GHz-band-signal transceiver circuit 32 receives a reception signal in the WiFi-2.4-GHz band from the second antenna terminal 12a via the band pass filter of the multiplexer 34 and outputs the signal to the RFIC 103.

The 5GNR-signal and LTE-ultra-high-frequency-band-signal transceiver circuit 33 receives a 5GNR transmission signal from the RFIC 102 and outputs the signal to the second antenna terminal 12a via the high pass filter of the multiplexer 34. The 5GNR-signal and LTE-ultra-high-frequency-band-signal transceiver circuit 33 receives a transmission signal in the LTE ultra-high-frequency band from the RFIC 101 and outputs the signal to the second antenna terminal 12*a* via the high pass filter of the multiplexer 34.

The 5GNR-signal and LTE-ultra-high-frequency-band-signal transceiver circuit 33 receives a 5GNR reception signal from the second antenna terminal 12*a* via the high pass filter of the multiplexer 34 and outputs the signal to the RFIC 102. The 5GNR-signal and LTE-ultra-high-frequency-band-signal transceiver circuit 33 receives a reception signal in the LTE ultra-high-frequency band from the second antenna terminal 12*a* via the high pass filter of the multiplexer 34 and outputs the signal to the RFIC 101.

The third circuit 4 includes a GPS-signal receiver circuit 41, a LTE-medium-frequency-band-signal receiver circuit 42, a LTE-high-frequency-band-signal and WiFi-2.4-GHz-band-signal transceiver circuit 43, a 5GNR-signal and LTE-ultra-high-frequency-band-signal transceiver circuit 44, an eLAA-signal and WiFi-5-GHz-band-signal transceiver circuit 45, and a multiplexer 46.

According to the first embodiment, a GPS signal includes about 1575.42 MHz in an L1 band. The present disclosure, however, is not limited thereto.

The eLAA (enhanced Licensed Assisted Access) is a technique for time division multiplexing LTE communication in a frequency band for which a license is not required. According to the embodiment, an eLAA band and a WiFi-5-GHz band include a center frequency ranging from about 5180 MHz to about 5825 MHz. The present disclosure, however, is not limited thereto.

The multiplexer 46, which is a 1-to-5 multiplexer, electrically connects the third antenna 13 and circuits such as the GPS-signal receiver circuit 41, the LTE-medium-frequency-band-signal receiver circuit 42, the LTE-high-frequency-band-signal and WiFi-2.4-GHz-band-signal transceiver circuit 43, the 5GNR-signal and LTE-ultra-high-frequency-band-signal transceiver circuit 44, and the eLAA-signal and WiFi-5-GHz-band-signal transceiver circuit 45 to each other.

The multiplexer 46 includes a low pass filter, a first band pass filter, a second band pass filter, a third band pass filter, and a high pass filter. The low pass filter passes a signal in the LTE medium-frequency band. The first band pass filter passes a GPS signal. The second band pass filter passes a signal in the LTE high-frequency band and a signal in the WiFi-2.4-GHz band. The third band pass filter passes a 5GNR signal and a signal in the LTE ultra-high-frequency band. The high pass filter passes an eLAA signal and a signal in the WiFi-5-GHz band.

The GPS-signal receiver circuit 41 receives a GPS signal from the third antenna terminal 13*a* via the first band pass filter of the multiplexer 46 and outputs the signal to the RFIC 104. The GPS-signal receiver circuit 41 may be capable of receiving a signal of a satellite positioning system such as GLONASS, Galileo, the BeiDou satellite positioning system, or the quasi-zenith satellite system.

The LTE-medium-frequency-band-signal receiver circuit 42 receives a reception signal in the LTE medium-frequency band from the third antenna 13 via the low pass filter of the multiplexer 46 and outputs the signal to the RFIC 101.

The LTE-high-frequency-band-signal and WiFi-2.4-GHz-band-signal transceiver circuit 43 receives a transmission signal in the LTE high-frequency band from the RFIC 101 and outputs the signal to the third antenna terminal 13*a* via the second band pass filter of the multiplexer 46. The LTE-high-frequency-band-signal and WiFi-2.4-GHz-band-signal transceiver circuit 43 receives a reception signal in the LTE high-frequency band from the third antenna terminal 13*a* via the second band pass filter of the multiplexer 46 and outputs the signal to the RFIC 101.

The LTE-high-frequency-band-signal and WiFi-2.4-GHz-band-signal transceiver circuit 43 receives a transmission signal in the WiFi-2.4-GHz band from the RFIC 103 and outputs the signal to the third antenna terminal 13*a* via the second band pass filter of the multiplexer 46. The LTE-high-frequency-band-signal and WiFi-2.4-GHz-band-signal transceiver circuit 43 receives a reception signal in the WiFi-2.4-GHz band from the third antenna terminal 13*a* via the second band pass filter of the multiplexer 46 and outputs the signal to the RFIC 103.

The 5GNR-signal and LTE-ultra-high-frequency-band-signal transceiver circuit 44 receives a 5GNR transmission signal from the RFIC 102 and outputs the signal to the third antenna terminal 13*a* via the third band pass filter of the multiplexer 46. The 5GNR-signal and LTE-ultra-high-frequency-band-signal transceiver circuit 44 receives a transmission signal in the LTE ultra-high-frequency band from the RFIC 101 and outputs the signal to the third antenna terminal 13*a* via the third band pass filter of the multiplexer 46.

The 5GNR-signal and LTE-ultra-high-frequency-band-signal transceiver circuit 44 receives a 5GNR reception signal from the third antenna terminal 13*a* via the third band pass filter of the multiplexer 46 and outputs the signal to the RFIC 102. The 5GNR-signal and LTE-ultra-high-frequency-band-signal transceiver circuit 44 receives a reception signal in the LTE ultra-high-frequency band from the third antenna terminal 13*a* via the third band pass filter of the multiplexer 46 and outputs the signal to the RFIC 101.

The eLAA-signal and WiFi-5-GHz-band-signal transceiver circuit 45 receives an eLAA transmission signal from the RFIC 101 and outputs the signal to the third antenna terminal 13*a* via the high pass filter of the multiplexer 46. The eLAA-signal and WiFi-5-GHz-band-signal transceiver circuit 45 receives a transmission signal in the WiFi-5-GHz band from the RFIC 103 and outputs the signal to the third antenna terminal 13*a* via the high pass filter of the multiplexer 46.

The eLAA-signal and WiFi-5-GHz-band-signal transceiver circuit 45 receives an eLAA reception signal from the third antenna terminal 13*a* via the high pass filter of the multiplexer 46 and outputs the signal to the RFIC 101. The eLAA-signal and WiFi-5-GHz-band-signal transceiver circuit 45 receives a reception signal in the WiFi-5-GHz band from the third antenna terminal 13*a* via the high pass filter of the multiplexer 46 and outputs the signal to the RFIC 103.

The fourth circuit 5 includes a LTE-medium-and-high-frequency-band-signal receiver circuit 51, a 5GNR-signal and LTE-ultra-high-frequency-band-signal transceiver circuit 52, an eLAA-signal and WiFi-5-GHz-band-signal transceiver circuit 53, and a multiplexer 54.

The multiplexer 54 electrically connects the fourth antenna 14 and circuits such as the LTE-medium-and-high-frequency-band-signal receiver circuit 51, the 5GNR-signal and LTE-ultra-high-frequency-band-signal transceiver circuit 52, and the eLAA-signal and WiFi-5-GHz-band-signal transceiver circuit 53 to each other.

The multiplexer 54 is a 1-to-3 triplexer. The multiplexer 54 includes a low pass filter, a band pass filter, and a high pass filter. The low pass filter passes a signal in the LTE medium-and-high-frequency band. The band pass filter passes a 5GNR signal and a signal in the LTE ultra-high-frequency band. The high pass filter passes an eLAA signal and a signal in the WiFi-5-GHz band.

The LTE-medium-and-high-frequency-band-signal receiver circuit 51 receives a reception signal in the LTE medium-and-high-frequency band from the fourth antenna terminal 14a via the low pass filter of the multiplexer 54 and outputs the signal to the RFIC 101.

The 5GNR-signal and LTE-ultra-high-frequency-band-signal transceiver circuit 52 receives a 5GNR transmission signal from the RFIC 102 and outputs the signal to the fourth antenna terminal 14a via the band pass filter of the multiplexer 54. The 5GNR-signal and LTE-ultra-high-frequency-band-signal transceiver circuit 52 receives a transmission signal in the LTE ultra-high-frequency band from the RFIC 101 and outputs the signal to the fourth antenna terminal 14a via the band pass filter of the multiplexer 54.

The 5GNR-signal and LTE-ultra-high-frequency-band-signal transceiver circuit 52 receives a 5GNR reception signal from the fourth antenna 14 via the band pass filter of the multiplexer 54 and outputs the signal to the RFIC 102. The 5GNR-signal and LTE-ultra-high-frequency-band-signal transceiver circuit 52 receives a reception signal in the LTE ultra-high-frequency band from the fourth antenna terminal 14a via the band pass filter of the multiplexer 54 and outputs the signal to the RFIC 101.

The eLAA-signal and WiFi-5-GHz-band-signal transceiver circuit 53 receives an eLAA transmission signal from the RFIC 101 and outputs the signal to the fourth antenna terminal 14a via the high pass filter of the multiplexer 54. The eLAA-signal and WiFi-5-GHz-band-signal transceiver circuit 53 receives a transmission signal in the WiFi-5-GHz band from the RFIC 103 and outputs the signal to the fourth antenna terminal 14a via the high pass filter of the multiplexer 54.

The eLAA-signal and WiFi-5-GHz-band-signal transceiver circuit 53 receives an eLAA reception signal from the fourth antenna terminal 14a via the high pass filter of the multiplexer 54 and outputs the signal to the RFIC 101. The eLAA-signal and WiFi-5-GHz-band-signal transceiver circuit 53 receives a reception signal in the WiFi-5-GHz band from the fourth antenna terminal 14a via the high pass filter of the multiplexer 54 and outputs the signal to the RFIC 103.

Figure 3:
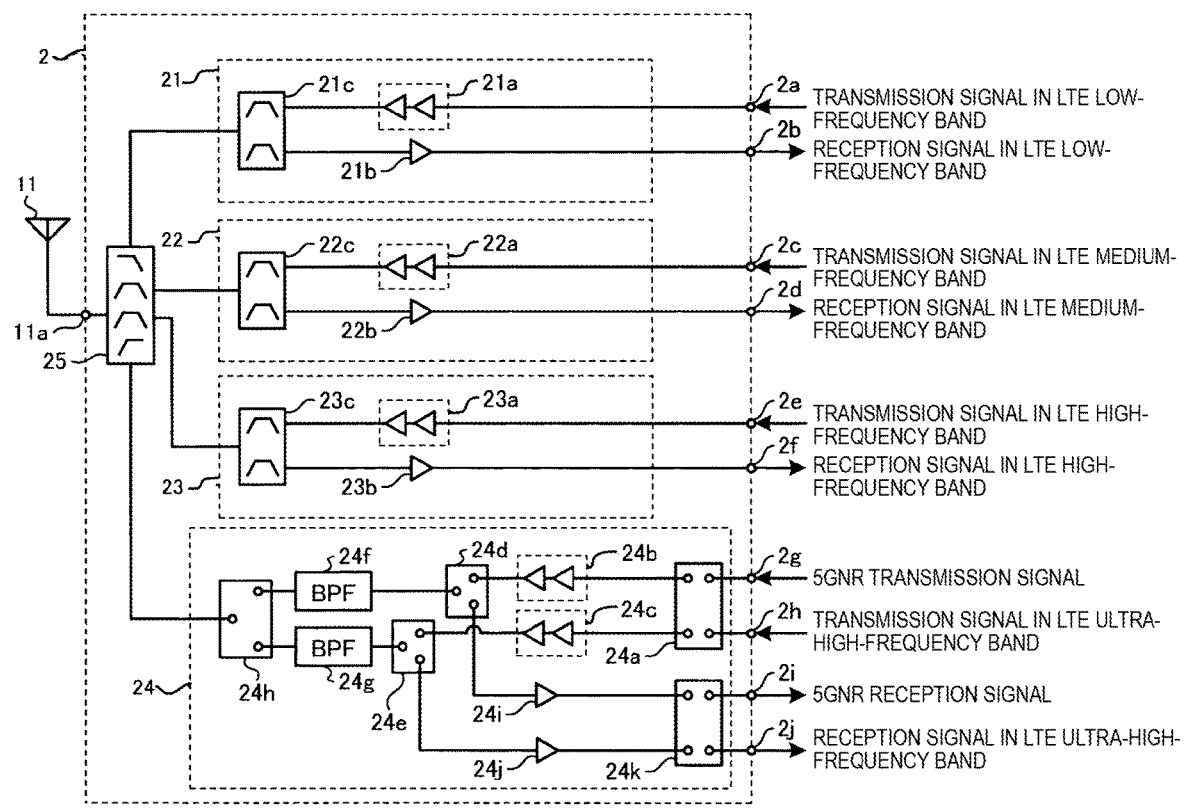
FIG. 3 illustrates the structure of a first circuit of the high-frequency-signal transceiver circuit according to the first embodiment.

FIG. 3 illustrates the structure of the first circuit of the high-frequency-signal transceiver circuit according to the first embodiment.

A set of the LTE-low-frequency-band-signal transceiver circuit 21, the LTE-medium-frequency-band-signal transceiver circuit 22, the LTE-high-frequency-band-signal transceiver circuit 23, the 5GNR-signal and LTE-ultra-high-frequency-band-signal transceiver circuit 24, and the multiplexer 25 is a single module. The present disclosure, however, is not limited thereto. The LTE-low-frequency-band-signal transceiver circuit 21, the LTE-medium-frequency-band-signal transceiver circuit 22, the LTE-high-frequency-band-signal transceiver circuit 23, the 5GNR-signal and LTE-ultra-high-frequency-band-signal transceiver circuit 24, and the multiplexer 25 may be different modules. In the module, one or more components are mounted on a substrate.

The LTE-low-frequency-band-signal transceiver circuit 21 includes a power amplifier 21a, a low-noise amplifier 21b, and a multiplexer 21c.

The power amplifier 21a is a two-stage amplifier. The present disclosure, however, is not limited thereto. The power amplifier 21a may be a single-stage amplifier or may be a three-or-more-stage amplifier. The same is true for the power amplifiers described later.

The multiplexer 21c is a 1-to-2 duplexer. The multiplexer 21c electrically connects the low pass filter of the multiplexer 25 and amplifiers such as the power amplifier 21a and the low-noise amplifier 21b to each other.

The multiplexer 21c includes a first band pass filter and a second band pass filter. The first band pass filter passes a transmission signal in the LTE low-frequency band. The second band pass filter passes a reception signal in the LTE low-frequency band.

The power amplifier 21a receives the transmission signal in the LTE low-frequency band from the RFIC 101 via a terminal 2a and outputs the signal to the first band pass filter of the multiplexer 21c.

The low-noise amplifier 21b receives the reception signal in the LTE low-frequency band from the second band pass filter of the multiplexer 21c and outputs the signal to the RFIC 101 via a terminal 2b.

The LTE-medium-frequency-band-signal transceiver circuit 22 includes a power amplifier 22a, a low-noise amplifier 22b, and a multiplexer 22c.

The multiplexer 22c is a 1-to-2 duplexer. The multiplexer 22c electrically connects the first band pass filter of the multiplexer 25 and amplifiers such as the power amplifier 22a and the low-noise amplifier 22b to each other.

The multiplexer 22c includes a first band pass filter and a second band pass filter. The first band pass filter passes a transmission signal in the LTE medium-frequency band. The second band pass filter passes a reception signal in the LTE medium-frequency band.

The power amplifier 22a receives the transmission signal in the LTE medium-frequency band from the RFIC 101 via a terminal 2c and outputs the signal to the first band pass filter of the multiplexer 22c.

The low-noise amplifier 22b receives the reception signal in the LTE medium-frequency band from the second band pass filter of the multiplexer 22c and outputs the signal to the RFIC 101 via a terminal 2d.

The LTE-high-frequency-band-signal transceiver circuit 23 includes a power amplifier 23a, a low-noise amplifier 23b, and a multiplexer 23c.

The multiplexer 23c is a 1-to-2 duplexer. The multiplexer 23c electrically connects the second band pass filter of the multiplexer 25 and amplifiers such as the power amplifier 23a and the low-noise amplifier 23b to each other.

The multiplexer 23c includes a first band pass filter and a second band pass filter. The first band pass filter passes a transmission signal in the LTE high-frequency band. The second band pass filter passes a reception signal in the LTE high-frequency band.

The power amplifier 23a receives the transmission signal in the LTE high-frequency band from the RFIC 101 via a terminal 2e and outputs the signal to the first band pass filter of the multiplexer 23c.

The low-noise amplifier 23b receives the reception signal in the LTE high-frequency band from the second band pass filter of the multiplexer 23c and outputs the signal to the RFIC 101 via a terminal 2f.

The 5GNR-signal and LTE-ultra-high-frequency-band-signal transceiver circuit 24 includes switches 24a, 24d, 24e, 24h, and 24k, power amplifiers 24b and 24c, band pass filters 24f and 24g, and low-noise amplifiers 24i and 24j.

The switches 24a and 24k are dual-port dual-throw switches. The switch 24d, 24e, and 24h are single-port dual-throw switches.

When a 4.5 to 4.99 GHz 5GNR signal is transmitted, the switch 24a electrically connects a terminal 2g and the power amplifier 24b to each other. The switch 24d electrically connects the power amplifier 24b and the band pass filter 24f to each other. The switch 24h electrically connects the band pass filter 24*f* and the high pass filter of the multiplexer 25 to each other. The power amplifier 24*b* receives the 4.5 to 4.99 GHz 5GNR transmission signal from the RFIC 102 via the terminal 2*g* and the switch 24*a*, amplifies the signal, and outputs the amplified 4.5 to 4.99 GHz 5GNR transmission signal to the band pass filter 24*f* via the switch 24*d*. The band pass filter 24*f* passes the 4.5 to 4.99 GHz 5GNR transmission signal amplified by the power amplifier 24*b* and outputs the signal to the high pass filter of the multiplexer 25 via the switch 24*h*.

When a 3.3 to 4.2 GHz 5GNR signal is transmitted, the switch 24*a* electrically connects the terminal 2*g* and the power amplifier 24*c* to each other. The switch 24*e* electrically connects the power amplifier 24*c* and the band pass filter 24*g* to each other. The switch 24*h* electrically connects the band pass filter 24*g* and the high pass filter of the multiplexer 25 to each other. The power amplifier 24*c* receives the 3.3 to 4.2 GHz 5GNR transmission signal from the RFIC 102 via the terminal 2*g* and the switch 24*a*, amplifies the signal, and outputs the amplified 3.3 to 4.2 GHz 5GNR transmission signal to the band pass filter 24*g* via the switch 24*e*. The band pass filter 24*g* passes the 3.3 to 4.2 GHz 5GNR transmission signal amplified by the power amplifier 24*c* and outputs the signal to the high pass filter of the multiplexer 25 via the switch 24*h*.

When a signal in the LTE ultra-high-frequency band is transmitted, the switch 24*a* electrically connects a terminal 2*h* and the power amplifier 24*c* to each other. The switch 24*e* electrically connects the power amplifier 24*c* and the band pass filter 24*g* to each other. The switch 24*h* electrically connects the band pass filter 24*g* and the high pass filter of the multiplexer 25 to each other. The power amplifier 24*c* receives the transmission signal in the LTE ultra-high-frequency band from the RFIC 101 via the terminal 2*h* and the switch 24*a*, amplifies the signal, and outputs the amplified transmission signal in the LTE ultra-high-frequency band to the band pass filter 24*g* via the switch 24*e*. The band pass filter 24*g* passes the transmission signal in the LTE ultra-high-frequency band amplified by the power amplifier 24*c* and outputs the signal to the high pass filter of the multiplexer 25 via the switch 24*h*.

When a 4.5 to 4.99 GHz 5GNR signal is received, the switch 24*h* electrically connects the high pass filter of the multiplexer 25 and the band pass filter 24*f* to each other. The switch 24*d* electrically connects the band pass filter 24*f* and the low-noise amplifier 24*i* to each other. The switch 24*k* electrically connects the low-noise amplifier 24*i* and a terminal 2*i* to each other. The band pass filter 24*f* receives the 4.5 to 4.99 GHz 5GNR reception signal from the high pass filter of the multiplexer 25 via the switch 24*h*, passes the signal, and outputs the signal to the low-noise amplifier 24*i* via the switch 24*d*. The low-noise amplifier 24*i* amplifies the 4.5 to 4.99 GHz 5GNR reception signal, and outputs the amplified 4.5 to 4.99 GHz 5GNR reception signal to the RFIC 102 via the switch 24*k* and the terminal 2*i*.

When a 3.3 to 4.2 GHz 5GNR signal is received, the switch 24*h* electrically connects the high pass filter of the multiplexer 25 and the band pass filter 24*g* to each other. The switch 24*e* electrically connects the band pass filter 24*g* and the low-noise amplifier 24*j* to each other. The switch 24*k* electrically connects the low-noise amplifier 24*j* and the terminal 2*i* to each other. The band pass filter 24*g* receives the 3.3 to 4.2 GHz 5GNR reception signal from the high pass filter of the multiplexer 25 via the switch 24*h*, passes the signal, and outputs the signal to the low-noise amplifier 24*j* via the switch 24*e*. The low-noise amplifier 24*j* amplifies the 3.3 to 4.2 GHz 5GNR reception signal and outputs the amplified 3.3 to 4.2 GHz 5GNR reception signal to the RFIC 102 via the switch 24*k* and the terminal 2*i*.

When a signal in the LTE ultra-high-frequency band is received, the switch 24*h* electrically connects the high pass filter of the multiplexer 25 and the band pass filter 24*g* to each other. The switch 24*e* electrically connects the band pass filter 24*g* and the low-noise amplifier 24*j* to each other. The switch 24*k* electrically connects the low-noise amplifier 24*j* and a terminal 2*j* to each other. The band pass filter 24*g* receives the reception signal in the LTE ultra-high-frequency band from the high pass filter of the multiplexer 25 via the switch 24*h*, passes the signal, and outputs the signal to the low-noise amplifier 24*j* via the switch 24*e*. The low-noise amplifier 24*j* amplifies the reception signal in the LTE ultra-high-frequency band and outputs the amplified reception signal in the LTE ultra-high-frequency band to the RFIC 101 via the switch 24*k* and the terminal 2*j*.

Figure 4:
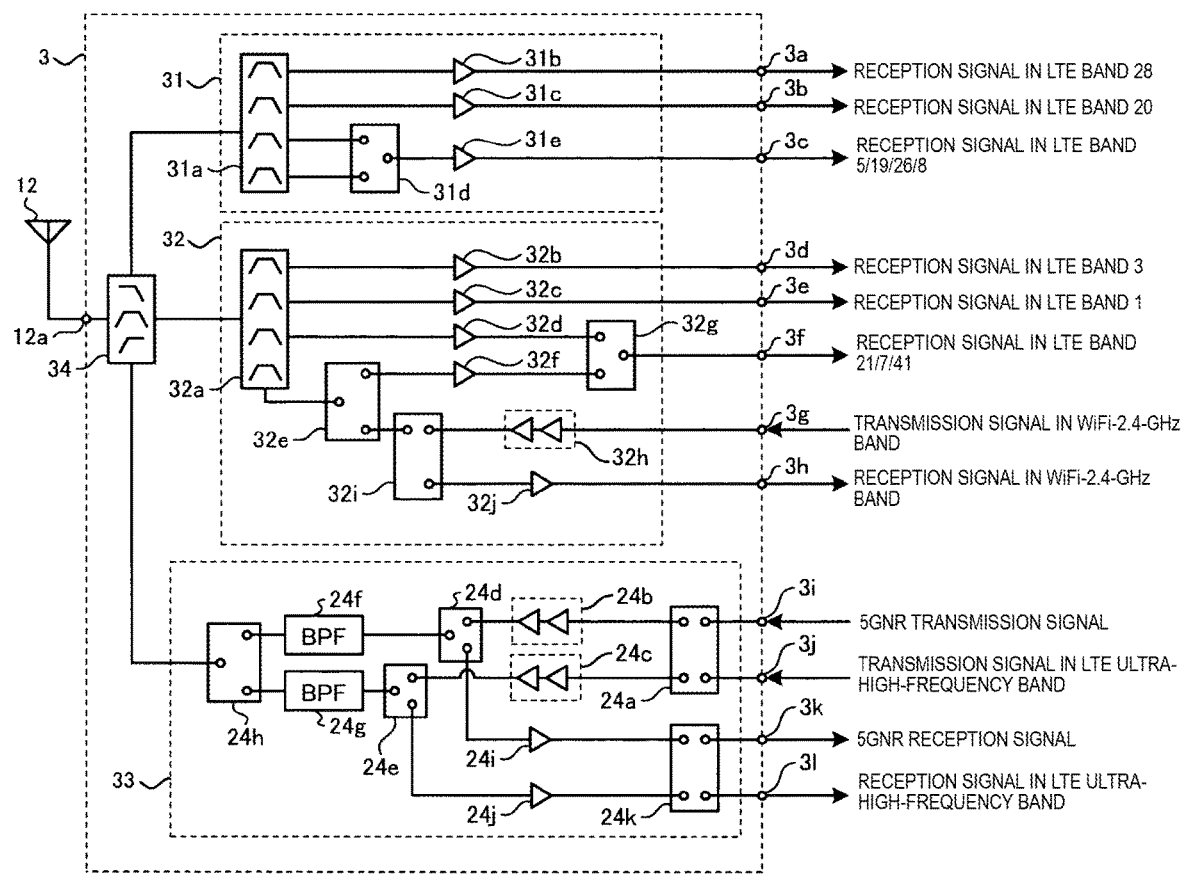
FIG. 4 illustrates the structure of a second circuit of the high-frequency-signal transceiver circuit according to the first embodiment.

FIG. 4 illustrates the structure of the second circuit of the high-frequency-signal transceiver circuit according to the first embodiment.

A set of the LTE-low-frequency-band-signal receiver circuit 31, the LTE-medium-and-high-frequency-band-signal receiver and WiFi-2.4-GHz-band-signal transceiver circuit 32, the 5GNR-signal and LTE-ultra-high-frequency-band-signal transceiver circuit 33, and the multiplexer 34 is a single module. The present disclosure, however, is not limited thereto. The LTE-low-frequency-band-signal receiver circuit 31, the LTE-medium-and-high-frequency-band-signal receiver and WiFi-2.4-GHz-band-signal transceiver circuit 32, the 5GNR-signal and LTE-ultra-high-frequency-band-signal transceiver circuit 33, and the multiplexer 34 may be different modules.

The LTE-low-frequency-band-signal receiver circuit 31 includes a multiplexer 31*a*, low-noise amplifiers 31*b*, 31*c*, and 31*e*, and a switch 31*d*.

The multiplexer 31*a* is a 1-to-4 quadplexer. The multiplexer 31*a* electrically connects the low pass filter of the multiplexer 34 and the low-noise amplifiers 31*b* and 31*c* to each other and electrically connects the low pass filter of the multiplexer 34 and the switch 31*d* to each other.

The multiplexer 31*a* includes a first band pass filter, a second band pass filter, a third band pass filter, and a fourth band pass filter. The first band pass filter passes a reception signal in the LTE band 28. The second band pass filter passes a reception signal in the LTE band 20. The third band pass filter passes a reception signal in the LTE bands 5, 19, and 26. The fourth band pass filter passes a reception signal in the LTE band 8.

The switch 31*d* is a single-port dual-throw switch.

The low-noise amplifier 31*b* receives the reception signal in the LTE band 28 from the first band pass filter of the multiplexer 31*a* and outputs the signal to the RFIC 101 via a terminal 3*a*.

The low-noise amplifier 31*c* receives the reception signal in the LTE band 20 from the second band pass filter of the multiplexer 31*a* and outputs the signal to the RFIC 101 via a terminal 3*b*.

When a signal in the LTE band 5, 19, or 26 is received, the switch 31*d* electrically connects the third band pass filter of the multiplexer 31*a* and the low-noise amplifier 31*e* to each other. The low-noise amplifier 31*e* receives the reception signal in the LTE band 5, 19, or 26 from the third band pass filter of the multiplexer 31*a* via the switch 31*d*, amplifies the signal, and outputs the amplified reception signal in the LTE band 5, 19, or 26 to the RFIC 101 via a terminal 3*c*.

When a signal in the LTE band 8 is received, the switch 31*d* electrically connects the fourth band pass filter of the multiplexer 31a and the low-noise amplifier 31e to each other. The low-noise amplifier 31e receives the reception signal in the LTE band 8 from the fourth band pass filter of the multiplexer 31a via the switch 31d, amplifies the signal, and outputs the amplified reception signal in the LTE band 8 to the RFIC 101 via the terminal 3c.

The LTE-medium-and-high-frequency-band-signal receiver and WiFi-2.4-GHz-band-signal transceiver circuit 32 includes a multiplexer 32a, low-noise amplifiers 32b, 32c, 32d, 32f, and 32j, switches 32e, 32g, and 32i, and a power amplifier 32h.

The multiplexer 32a is a 1-to-4 quadplexer. The multiplexer 32a electrically connects the band pass filter of the multiplexer 34 and the low-noise amplifiers 32b, 32c, and 32d to each other, and electrically connects the band pass filter of the multiplexer 34 and the switch 32e to each other.

The multiplexer 32a includes a first band pass filter, a second band pass filter, a third band pass filter, and a fourth band pass filter. The first band pass filter passes a reception signal in the LTE band 3. The second band pass filter passes a reception signal in the LTE band 1. The third band pass filter passes a reception signal in the LTE band 21. The fourth band pass filter passes a reception signal in the LTE bands 7 and 41 and a reception signal in the WiFi-2.4-GHz band.

The switches 32e, 32g, and 32i are single-port dual-throw switches.

The low-noise amplifier 32b receives the reception signal in the LTE band 3 from the first band pass filter of the multiplexer 32a and outputs the signal to the RFIC 101 via a terminal 3d.

The low-noise amplifier 32c receives the reception signal in the LTE band 1 from the second band pass filter of the multiplexer 32a and outputs the signal to the RFIC 101 via a terminal 3e.

When a signal in the LTE band 21 is received, the switch 32g electrically connects the low-noise amplifier 32d and a terminal 3f to each other. The low-noise amplifier 32d receives the reception signal in the LTE band 21 from the third band pass filter of the multiplexer 32a, amplifies the signal, and outputs the amplified reception signal in the LTE band 21 to the RFIC 101 via the switch 32g and the terminal 3f.

When a signal in the LTE band 7 or 41 is received, the switch 32e electrically connects the fourth band pass filter of the multiplexer 32a and the low-noise amplifier 32f to each other. The switch 32g electrically connects the low-noise amplifier 32f and the terminal 3f to each other. The low-noise amplifier 32f receives the reception signal in the LTE band 7 or 41 from the fourth band pass filter of the multiplexer 32a via the switch 32e, amplifies the signal, and outputs the amplified reception signal in the LTE band 7 or 41 to the RFIC 101 via the switch 32g and the terminal 3f.

When a signal in the WiFi-2.4-GHz band is transmitted, the switch 32i electrically connects the power amplifier 32h and the switch 32e to each other. The switch 32e electrically connects the switch 32i and the fourth band pass filter of the multiplexer 32a to each other. The power amplifier 32h receives the transmission signal in the WiFi-2.4-GHz band from the RFIC 103 via a terminal 3g, amplifies the signal, and outputs the amplified transmission signal in the WiFi-2.4-GHz band to the fourth band pass filter of the multiplexer 32a via the switches 32i and 32e.

When a signal in the WiFi-2.4-GHz band is received, the switch 32e electrically connects the fourth band pass filter of the multiplexer 32a and the switch 32i to each other. The switch 32i electrically connects the switch 32e and the low-noise amplifier 32j to each other. The low-noise amplifier 32j receives the reception signal in the WiFi-2.4-GHz band from the fourth band pass filter of the multiplexer 32a via the switches 32i and 32e, amplifies the signal, and outputs the amplified reception signal in the WiFi-2.4-GHz band to the RFIC 103 via a terminal 3h.

The circuit components of the 5GNR-signal and LTE-ultra-high-frequency-band-signal transceiver circuit 33 are the same as the circuit components of the 5GNR-signal and LTE-ultra-high-frequency-band-signal transceiver circuit 24 (see FIG. 3) and are designated by like reference numbers, and a description thereof is omitted.

The 5GNR-signal and LTE-ultra-high-frequency-band-signal transceiver circuit 33 receives a 4.5 to 4.99 GHz 5GNR transmission signal from the RFIC 102 via a terminal 3i, amplifies the signal, and outputs the amplified 4.5 to 4.99 GHz 5GNR transmission signal to the high pass filter of the multiplexer 34.

The 5GNR-signal and LTE-ultra-high-frequency-band-signal transceiver circuit 33 receives a transmission signal in the LTE ultra-high-frequency band from the RFIC 101 via a terminal 3j, amplifies the signal, and outputs the amplified transmission signal in the LTE ultra-high-frequency band to the high pass filter of the multiplexer 34.

The 5GNR-signal and LTE-ultra-high-frequency-band-signal transceiver circuit 33 receives a 4.5 to 4.99 GHz 5GNR reception signal from the high pass filter of the multiplexer 34, amplifies the signal, and outputs the amplified 4.5 to 4.99 GHz 5GNR reception signal to the RFIC 102 via a terminal 3k.

The 5GNR-signal and LTE-ultra-high-frequency-band-signal transceiver circuit 33 receives a reception signal in the LTE ultra-high-frequency band from the high pass filter of the multiplexer 34, amplifies the signal, and outputs the amplified reception signal in the LTE ultra-high-frequency band to the RFIC 101 via a terminal 3l.

The LTE-medium-and-high-frequency-band-signal receiver and WiFi-2.4-GHz-band-signal transceiver circuit 32 and the 5GNR-signal and LTE-ultra-high-frequency-band-signal transceiver circuit 33 are preferably isolated from each other. Examples of the isolation include an increase in the physical distance between the circuits and isolation with a metal shield. The reason is that the frequency of the second harmonic of a signal in the LTE band 3, 1, 21, 7, or 41 or the WiFi-2.4-GHz band is close to the frequency of a 5GNR signal or a signal in the LTE ultra-high-frequency band, and accordingly, there is a possibility that the 5GNR-signal and LTE-ultra-high-frequency-band-signal transceiver circuit 33 is affected by the second harmonic of the signal in the LTE band 3, 1, 21, 7, or 41 or the WiFi-2.4-GHz band.

Figure 5:
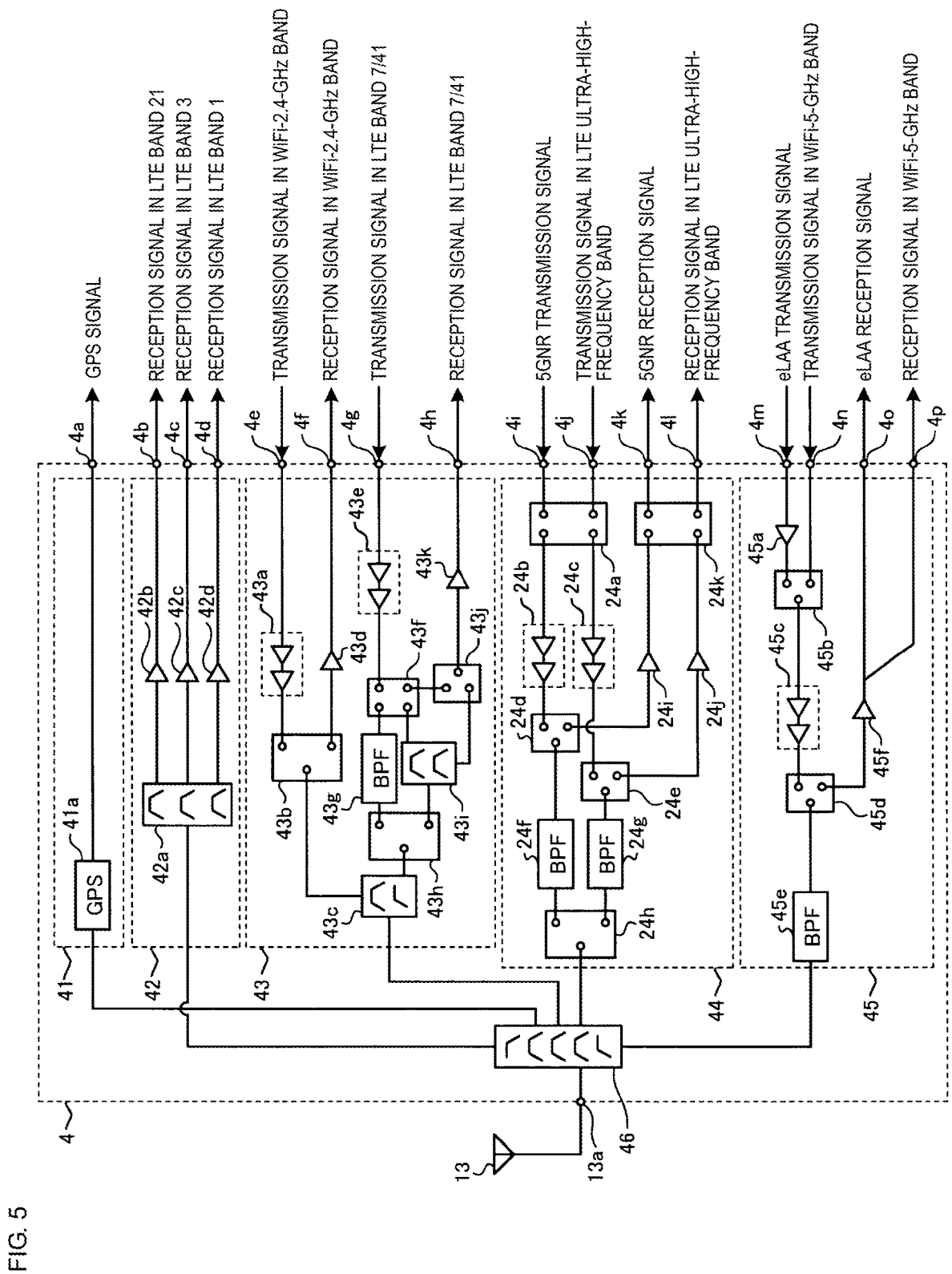
FIG. 5 illustrates the structure of a third circuit of the high-frequency-signal transceiver circuit according to the first embodiment.

FIG. 5 illustrates the structure of the third circuit of the high-frequency-signal transceiver circuit according to the first embodiment.

A set of the GPS-signal receiver circuit 41, the LTE-medium-frequency-band-signal receiver circuit 42, the LTE-high-frequency-band-signal and WiFi-2.4-GHz-band-signal transceiver circuit 43, the 5GNR-signal and LTE-ultra-high-frequency-band-signal transceiver circuit 44, the eLAA-signal and WiFi-5-GHz-band-signal transceiver circuit 45, and the multiplexer 46 is a single module. The present disclosure, however, is not limited thereto. The GPS-signal receiver circuit 41, the LTE-medium-frequency-band-signal receiver circuit 42, the LTE-high-frequency-band-signal and WiFi-2.4-GHz-band-signal transceiver circuit 43, the 5GNR-signal and LTE-ultra-high-frequency-band-signal transceiver circuit 44, the eLAA-signal and WiFi-5-GHz-band-signal transceiver circuit 45, and the multiplexer 46 may be different modules.

The GPS-signal receiver circuit 41 includes a GPS receiver 41a. The GPS receiver 41a receives a GPS signal from the first band pass filter of the multiplexer 46 and outputs the signal to the RFIC 104 via a terminal 4a.

The LTE-medium-frequency-band-signal receiver circuit 42 includes a multiplexer 42a, and low-noise amplifiers 42b, 42c, and 42d.

The multiplexer 42a is a 1-to-3 triplexer. The multiplexer 42a electrically connects the low pass filter of the multiplexer 46 and the low-noise amplifiers 42b, 42c, and 42d to each other.

The multiplexer 42a includes a first band pass filter, a second band pass filter, and a third band pass filter. The first band pass filter passes a reception signal in the LTE band 21. The second band pass filter passes a reception signal in the LTE band 3. The third band pass filter passes a reception signal in the LTE band 1.

The low-noise amplifier 42b receives the reception signal in the LTE band 21 from the first band pass filter of the multiplexer 42a and outputs the signal to the RFIC 101 via a terminal 4b.

The low-noise amplifier 42c receives the reception signal in the LTE band 3 from the second band pass filter of the multiplexer 42a and outputs the signal to the RFIC 101 via a terminal 4c.

The low-noise amplifier 42d receives the reception signal in the LTE band 1 from the third band pass filter of the multiplexer 42a and outputs the signal to the RFIC 101 via a terminal 4d.

The LTE-high-frequency-band-signal and WiFi-2.4-GHz-band-signal transceiver circuit 43 includes power amplifiers 43a and 43e, switches 43b, 43f, 43h, and 43j, multiplexers 43c and 43i, low-noise amplifiers 43d and 43k, and a band pass filter 43g.

The multiplexer 43c is a 1-to-2 duplexer. The multiplexer 43c electrically connects the second band pass filter of the multiplexer 46 and the switches 43b and 43h to each other.

The multiplexer 43c includes a band pass filter and a high pass filter. The band pass filter passes a signal in the WiFi-2.4-GHz band. The high pass filter passes a signal in the LTE bands 7 and 41.

The multiplexer 43i is a 1-to-2 duplexer. The multiplexer 43i electrically connects the switch 43h and the switches 43f and 43j to each other.

The multiplexer 43i includes a first band pass filter and a second band pass filter. The first band pass filter passes a transmission signal in the LTE band 7. The second band pass filter passes a reception signal in the LTE band 7.

The band pass filter 43g passes a signal in the LTE band 41.

The switches 43b, 43h, and 43j are single-port dual-throw switches. The switch 43f is a dual-port dual-throw switch.

When a signal in the WiFi-2.4-GHz band is transmitted, the switch 43b electrically connects the power amplifier 43a and the band pass filter of the multiplexer 43c to each other. The power amplifier 43a receives the transmission signal in the WiFi-2.4 GHz band from the RFIC 103 via a terminal 4e, amplifies the signal, and outputs the amplified transmission signal in the WiFi-2.4 GHz band to the band pass filter of the multiplexer 43c via the switch 43b.

When a signal in the WiFi-2.4 GHz band is received, the switch 43b electrically connects the band pass filter of the multiplexer 43c and the low-noise amplifier 43d to each other. The low-noise amplifier 43d receives the reception signal in the WiFi-2.4 GHz band from the band pass filter of the multiplexer 43c via the switch 43b and outputs the signal to the RFIC 103 via a terminal 4f.

When a signal in the LTE band 7 is transmitted, the switch 43f electrically connects the power amplifier 43e and the first band pass filter of the multiplexer 43i to each other. The switch 43h electrically connects the first band pass filter of the multiplexer 43i and the high pass filter of the multiplexer 43c to each other. The power amplifier 43e receives the transmission signal in the LTE band 7 from the RFIC 101 via a terminal 4g, amplifies the signal, and outputs the amplified transmission signal in the LTE band 7 to the first band pass filter of the multiplexer 43i via the switch 43f. The first band pass filter of the multiplexer 43i passes the amplified transmission signal in the LTE band 7 and outputs the signal to the high pass filter of the multiplexer 43c via the switch 43h. The high pass filter of the multiplexer 43c passes the amplified transmission signal in the LTE band 7 and outputs the signal to the second band pass filter of the multiplexer 46.

When a signal in the LTE band 41 is transmitted, the switch 43f electrically connects the power amplifier 43e and the band pass filter 43g to each other. The switch 43h electrically connects the band pass filter 43g and the high pass filter of the multiplexer 43c to each other. The power amplifier 43e receives the transmission signal in the LTE band 41 from the RFIC 101 via the terminal 4g, amplifies the signal, and outputs the amplified transmission signal in the LTE band 41 to the band pass filter 43g via the switch 43f. The band pass filter 43g passes the amplified transmission signal in the LTE band 41 and outputs the signal to the high pass filter of the multiplexer 43c via the switch 43h. The high pass filter of the multiplexer 43c passes the amplified transmission signal in the LTE band 41 and outputs the signal to the second band pass filter of the multiplexer 46.

When a signal in the LTE band 7 is received, the switch 43h electrically connects the high pass filter of the multiplexer 43c and the second band pass filter of the multiplexer 43i to each other. The switch 43j electrically connects the second band pass filter of the multiplexer 43i and the low-noise amplifier 43k to each other. The low-noise amplifier 43k receives the reception signal in the LTE band 7 from the second band pass filter of the multiplexer 43i via the switch 43j, amplifies the signal, and outputs the amplified reception signal in the LTE band 7 to the RFIC 101 via a terminal 4h.

When a signal in the LTE band 41 is received, the switch 43h electrically connects the high pass filter of the multiplexer 43c and the band pass filter 43g to each other. The switch 43f electrically connects the band pass filter 43g and the switch 43j to each other. The switch 43j electrically connects the switch 43f and the low-noise amplifier 43k to each other. The low-noise amplifier 43k receives the reception signal in the LTE band 41 from the band pass filter 43g via the switches 43f and 43j, amplifies the signal, and outputs the amplified reception signal in the LTE band 41 to the RFIC 101 via the terminal 4h.

The circuit components of the 5GNR-signal and LTE-ultra-high-frequency-band-signal transceiver circuit 44 are the same as the circuit components of the 5GNR-signal and LTE-ultra-high-frequency-band-signal transceiver circuit 24 (see FIG. 2) and are designated by like reference numbers, and a description thereof is omitted.

The 5GNR-signal and LTE-ultra-high-frequency-band-signal transceiver circuit 44 receives a 4.5 to 4.99 GHz 5GNR transmission signal from the RFIC 102 via a terminal

4*i*, amplifies the signal, and outputs the amplified 4.5 to 4.99 GHz 5GNR transmission signal to the third band pass filter of the multiplexer 46.

The 5GNR-signal and LTE-ultra-high-frequency-band-signal transceiver circuit 44 receives a transmission signal in the LTE ultra-high-frequency band from the RFIC 101 via a terminal 4*j*, amplifies the signal, and outputs the amplified transmission signal in the LTE ultra-high-frequency band to the third band pass filter of the multiplexer 46.

The 5GNR-signal and LTE-ultra-high-frequency-band-signal transceiver circuit 44 receives a 4.5 to 4.99 GHz 5GNR reception signal from the third band pass filter of the multiplexer 46, amplifies the signal, and outputs the amplified 4.5 to 4.99 GHz 5GNR reception signal to the RFIC 102 via a terminal 4*k*.

The 5GNR-signal and LTE-ultra-high-frequency-band-signal transceiver circuit 44 receives a reception signal in the LTE ultra-high-frequency band from the third band pass filter of the multiplexer 46, amplifies the signal, and outputs the amplified reception signal in the LTE ultra-high-frequency band to the RFIC 101 via a tSerminal 41.

The eLAA-signal and WiFi-5-GHz-band-signal transceiver circuit 45 includes power amplifiers 45*a* and 45*c*, switches 45*b* and 45*d*, a band pass filter 45*e*, and a low-noise amplifier 45*f*.

The band pass filter 45*e* passes an eLAA signal and a signal of in the WiFi-5-GHz band.

The switches 45*b* and 45*d* are single-port dual-throw switches.

When an eLAA signal is transmitted, the switch 45*b* electrically connects the power amplifier 45*a* and the power amplifier 45*c* to each other. The switch 45*d* electrically connects the power amplifier 45*c* and the band pass filter 45*e* to each other. The power amplifier 45*a* receives the eLAA transmission signal from the RFIC 101 via a terminal 4*m*, amplifies the signal, and outputs the amplified eLAA transmission signal to the power amplifier 45*c* via the switch 45*b*. The power amplifier 45*c* receives the eLAA transmission signal amplified by the power amplifier 45*a* from the power amplifier 45*a* via the switch 45*b*, further amplifies the signal, and outputs the amplified eLAA transmission signal to the band pass filter 45*e* via the switch 45*d*. The band pass filter 45*e* passes the eLAA transmission signal amplified by the power amplifier 45*c* and outputs the signal to the high pass filter of the multiplexer 46.

When a signal in the WiFi-5-GHz band is transmitted, the switch 45*b* electrically connects a terminal 4*n* and the power amplifier 45*c* to each other. The switch 45*d* electrically connects the power amplifier 45*c* and the band pass filter 45*e* to each other. The power amplifier 45*c* receives the transmission signal in the WiFi-5-GHz band from the RFIC 103 via the terminal 4*n* and the switch 45*b*, amplifies the signal, and outputs the amplified transmission signal in the WiFi-5-GHz band to the band pass filter 45*e* via the switch 45*d*. The band pass filter 45*e* passes the transmission signal in the WiFi-5-GHz band amplified by the power amplifier 45*c* and outputs the signal to the high pass filter of the multiplexer 46.

When an eLAA signal is received, or a signal in the WiFi-5-GHz band is received, the switch 45*d* electrically connects the band pass filter 45*e* and the low-noise amplifier 45*f* to each other. The band pass filter 45*e* receives the eLAA reception signal or the reception signal in the WiFi-5-GHz band from the high pass filter of the multiplexer 46, passes the signal, and outputs the signal to the low-noise amplifier 45*f* via the switch 45*d*. The low-noise amplifier 45*f* amplifies the eLAA reception signal or the reception signal in the WiFi-5-GHz band and outputs the amplified eLAA reception signal to the RFIC 101 via a terminal 4*o*. The low-noise amplifier 45*f* amplifies the reception signal in the WiFi-5-GHz band and outputs the amplified reception signal in the WiFi-5-GHz band to the RFIC 103 via a terminal 4*p*.

The LTE-high-frequency-band-signal and WiFi-2.4-GHz-band-signal transceiver circuit 43 and the 5GNR-signal and LTE-ultra-high-frequency-band-signal transceiver circuit 44 are preferably isolated from each other. The reason is that the frequency of the second harmonic of a signal in the LTE band 7 or 41 or the WiFi-2.4 GHz band is close to the frequency of a 5GNR signal or a signal in the LTE ultra-high-frequency band, and accordingly, there is a possibility that the 5GNR-signal and LTE-ultra-high-frequency-band-signal transceiver circuit 44 is affected by the second harmonic of the signal in the LTE band 7 or 41 or the WiFi-2.4 GHz band.

The 5GNR-signal and LTE-ultra-high-frequency-band-signal transceiver circuit 44 and the eLAA-signal and WiFi-5-GHz-band-signal transceiver circuit 45 are preferably isolated from each other. The reason is that the frequency of a 5GNR signal or a signal in the LTE ultra-high-frequency band is close to the frequency of an eLAA signal or a signal in the WiFi-5-GHz band, and accordingly, there is a possibility that the 5GNR-signal and LTE-ultra-high-frequency-band-signal transceiver circuit 44 and the eLAA-signal and WiFi-5-GHz-band-signal transceiver circuit 45 are affected by each other. In the case of conducting the time-division transmission and reception of a 5GNR signal or a signal in the LTE ultra-high-frequency band and time-division transmission and reception of an eLAA signal or a signal in the WiFi-5-GHz band, isolation is not necessary.

Figure 6:
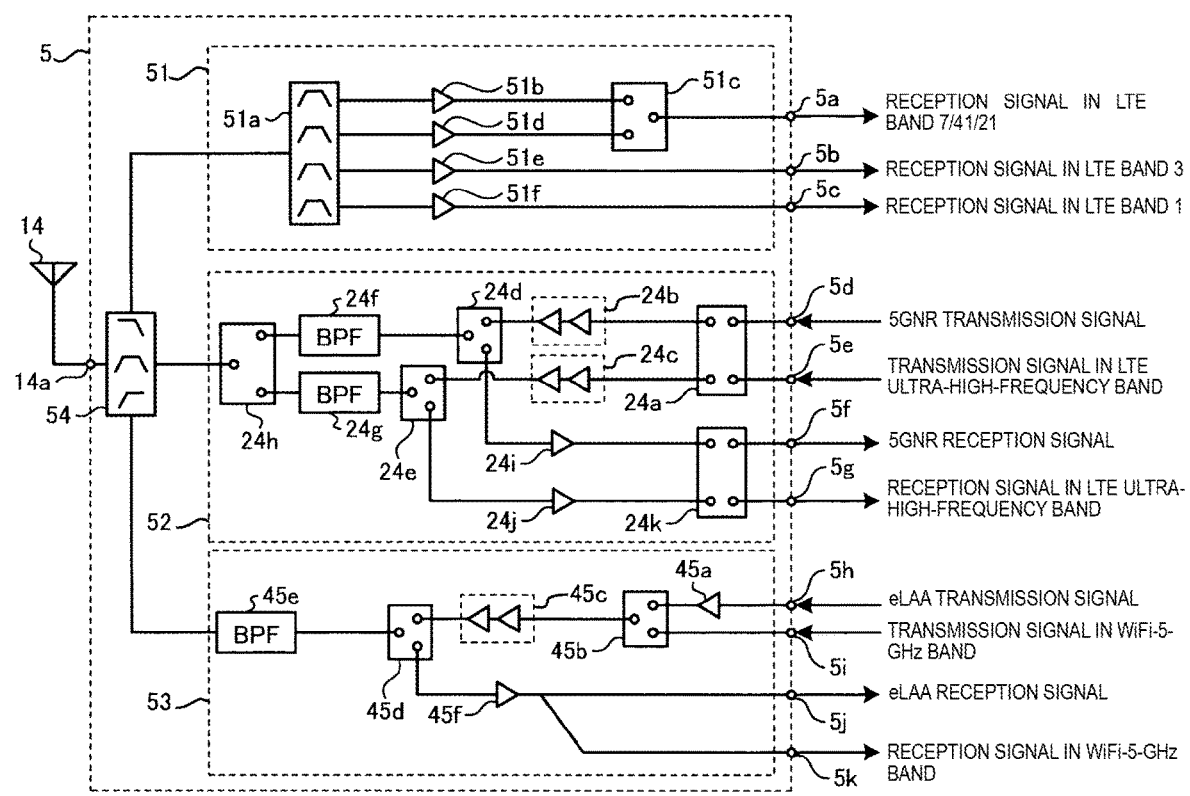
FIG. 6 illustrates the structure of a fourth circuit of the high-frequency-signal transceiver circuit according to the first embodiment.

FIG. 6 illustrates the structure of the fourth circuit of the high-frequency-signal transceiver circuit according to the first embodiment.

A set of the LTE-medium-and-high-frequency-band-signal receiver circuit 51, the 5GNR-signal and LTE-ultra-high-frequency-band-signal transceiver circuit 52, the eLAA-signal and WiFi-5-GHz-band-signal transceiver circuit 53, and the multiplexer 54 is a single module. The present disclosure, however, is not limited thereto. The LTE-medium-and-high-frequency-band-signal receiver circuit 51, the 5GNR-signal and LTE-ultra-high-frequency-band-signal transceiver circuit 52, the eLAA-signal and WiFi-5-GHz-band-signal transceiver circuit 53, and the multiplexer 54 may be different modules.

The LTE-medium-and-high-frequency-band-signal receiver circuit 51 includes a multiplexer 51*a*, low-noise amplifiers 51*b*, 51*d*, 51*e*, and 51*f*, and a switch 51*c*.

The multiplexer 51*a* is a 1-to-4 quadplexer. The multiplexer 51*a* electrically connects the low pass filter of the multiplexer 54 and the low-noise amplifiers 51*b*, 51*d*, 51*e*, and 51*f* to each other.

The multiplexer 51*a* includes a first band pass filter, a second band pass filter, a third band pass filter, and a fourth band pass filter. The first band pass filter passes a reception signal in the LTE bands 7 and 41. The second band pass filter passes a reception signal in the LTE band 21. The third band pass filter passes a reception signal in the LTE band 3. The fourth band pass filter passes a reception signal in the LTE band 1.

The switch 51*c* is a single-port dual-throw switch.

When a signal in the LTE band 7 or 41 is received, the switch 51*c* electrically connects the low-noise amplifier 51*b* and a terminal 5*a* to each other. The low-noise amplifier 51*b* receives the reception signal in the LTE band 7 or 41 from the first band pass filter of the multiplexer 51*a*, amplifies the signal, and outputs the amplified reception signal in the LTE band 7 or 41 to the RFIC 101 via the terminal 5*a*.

When a signal in the LTE band 21 is received, the switch 51*c* electrically connects the low-noise amplifier 51*d* and the terminal 5*a* to each other. The low-noise amplifier 51*d* receives the reception signal in the LTE band 21 from the second band pass filter of the multiplexer 51*a*, amplifies the signal, and outputs the amplified reception signal in the LTE band 21 to the RFIC 101 via the terminal 5*a*.

The low-noise amplifier 51*e* receives a reception signal in the LTE band 3 from the third band pass filter of the multiplexer 51*a*, amplifies the signal, and outputs the amplified reception signal in the LTE band 3 to the RFIC 101 via a terminal 5*b*.

The low-noise amplifier 51*f* receives a reception signal in the LTE band 1 from the fourth band pass filter of the multiplexer 51*a*, amplifies the signal, and outputs the amplified reception signal in the LTE band 1 to the RFIC 101 via a terminal 5*c*.

The circuit components of the 5GNR-signal and LTE-ultra-high-frequency-band-signal transceiver circuit 52 are the same as the circuit components of the 5GNR-signal and LTE-ultra-high-frequency-band-signal transceiver circuit 24 (see FIG. 3) and are designated by like reference numbers, and a description thereof is omitted.

The 5GNR-signal and LTE-ultra-high-frequency-band-signal transceiver circuit 52 receives a 4.5 to 4.99 GHz 5GNR transmission signal from the RFIC 102 via a terminal 5*d*, amplifies the signal, and outputs the amplified 4.5 to 4.99 GHz 5GNR transmission signal to the band pass filter of the multiplexer 54.

The 5GNR-signal and LTE-ultra-high-frequency-band-signal transceiver circuit 52 receives a transmission signal in the LTE ultra-high-frequency band from the RFIC 101 via a terminal 5*e*, amplifies the signal, and outputs the amplified transmission signal in the LTE ultra-high-frequency band to the band pass filter of the multiplexer 54.

The 5GNR-signal and LTE-ultra-high-frequency-band-signal transceiver circuit 52 receives a 4.5 to 4.99 GHz 5GNR reception signal from the band pass filter of the multiplexer 54, amplifies the signal, and outputs the amplified 4.5 to 4.99 GHz 5GNR reception signal to the RFIC 102 via a terminal 5*f*.

The 5GNR-signal and LTE-ultra-high-frequency-band-signal transceiver circuit 52 receives a reception signal in the LTE ultra-high-frequency band from the band pass filter of the multiplexer 54, amplifies the signal, and outputs the amplified reception signal in the LTE ultra-high-frequency band to the RFIC 101 via a terminal 5*g*.

The circuit components of the eLAA-signal and WiFi-5-GHz-band-signal transceiver circuit 53 are the same as the circuit components of the eLAA-signal and WiFi-5-GHz-band-signal transceiver circuit 45 (see FIG. 5) and are designated by like reference numbers, and a description thereof is omitted.

The eLAA-signal and WiFi-5-GHz-band-signal transceiver circuit 53 receives an eLAA transmission signal from the RFIC 101 via a terminal 5*h*, amplifies the signal, and outputs the amplified eLAA transmission signal to the high pass filter of the multiplexer 54.

The eLAA-signal and WiFi-5-GHz-band-signal transceiver circuit 53 receives a transmission signal in the WiFi-5-GHz band from the RFIC 103 via a terminal 5*i*, amplifies the signal, and outputs the amplified transmission signal in the WiFi-5-GHz band to the high pass filter of the multiplexer 54.

The eLAA-signal and WiFi-5-GHz-band-signal transceiver circuit 53 receives an eLAA reception signal from the high pass filter of the multiplexer 54, amplifies the signal, and outputs the amplified eLAA reception signal to the RFIC 101 via a terminal 5*j*.

The eLAA-signal and WiFi-5-GHz-band-signal transceiver circuit 53 receives a reception signal in the WiFi-5-GHz band from the high pass filter of the multiplexer 54, amplifies the signal, and outputs the amplified reception signal in the WiFi-5-GHz band to the RFIC 103 via a terminal 5*k*.

The LTE-medium-and-high-frequency-band-signal receiver circuit 51 and the 5GNR-signal and LTE-ultra-high-frequency-band-signal transceiver circuit 52 are preferably isolated from each other. The reason is that the frequency of the second harmonic of a signal in the LTE band 7, 41, or 21 is close to the frequency of a 5GNR signal or a signal in the LTE ultra-high-frequency band, and accordingly, there is a possibility that the 5GNR-signal and LTE-ultra-high-frequency-band-signal transceiver circuit 52 is affected by the second harmonic of the signal in the LTE band 7, 41, or 21.

The 5GNR-signal and LTE-ultra-high-frequency-band-signal transceiver circuit 52 and the eLAA-signal and WiFi-5-GHz-band-signal transceiver circuit 53 are preferably isolated from each other. The reason is that the frequency of a 5GNR signal or a signal in the LTE ultra-high-frequency band is close to the frequency of an eLAA signal or a signal in the WiFi-5-GHz band, and accordingly, there is a possibility that the 5GNR-signal and LTE-ultra-high-frequency-band-signal transceiver circuit 52 and the eLAA-signal and WiFi-5-GHz-band-signal transceiver circuit 53 are affected by each other. In the case of conducting the time-division transmission and reception of a 5GNR signal or a signal in the LTE ultra-high-frequency band and time-division transmission and reception of an eLAA signal or a signal in the WiFi-5-GHz band, isolation is not necessary.

The lower limit of the frequency of the signal that is received by the first circuit 2 and the second circuit 3 is 758 MHz (LTE band 28). The lower limit of the frequency of the signal that is received by the third circuit 4 and the fourth circuit 5 is 1447.9 MHz (LTE band 21). The GPS-signal receiver circuit 41 is included in the third circuit 4 or the fourth circuit 5. Accordingly, the lower limit of the frequency of the signal that is received by the third circuit 4 and the fourth circuit 5 that can include the GPS-signal receiver circuit 41 is higher than the lower limit of the frequency of the signal that is received by the first circuit 2 and the second circuit 3.

The first circuit 2 to the fourth circuit 5 can transmit and receive a 5GNR signal and a signal in the LTE ultra-high-frequency band as described above. That is, the high-frequency-signal transceiver circuit 1 achieves 4×4 MIMO communication (multiple-input and multiple-output communication) in the 5GNR and LTE ultra-high-frequency bands. Consequently, the high-frequency-signal transceiver circuit 1 can improve the quality and speed of communication in the 5GNR and LTE ultra-high-frequency bands.

In the 5GNR-signal and LTE-ultra-high-frequency-band-signal transceiver circuits 24, 33, 44, and 52, the power amplifier 24*c* is used to amplify a 5GNR transmission signal in the 3.5 GHz band and a transmission signal in the LTE ultra-high-frequency band. In addition, the low-noise amplifier 24*j* is used to amplify a 5GNR reception signal in the 3.5 GHz band and a reception signal in the LTE ultra-high-frequency band.

Consequently, the high-frequency-signal transceiver circuit 1 enables the size and cost of the circuit to be decreased.

The high-frequency-signal transceiver circuit 1 enables the number of circuit components that are added to an existing LTE front-end circuit to be decreased. Consequently, the high-frequency-signal transceiver circuit 1 enables the size and cost of the circuit to be decreased.

The high-frequency-signal transceiver circuit 1 achieves LTE, WiFi, 5GNR, and LTE-ultra-high-frequency-band communication with the four antennas of the first antenna 11 to the fourth antenna 14, the number of which is small. Consequently, the high-frequency-signal transceiver circuit 1 enables the size and cost of the mobile communication device to be decreased.

First Modification

Figure 7:
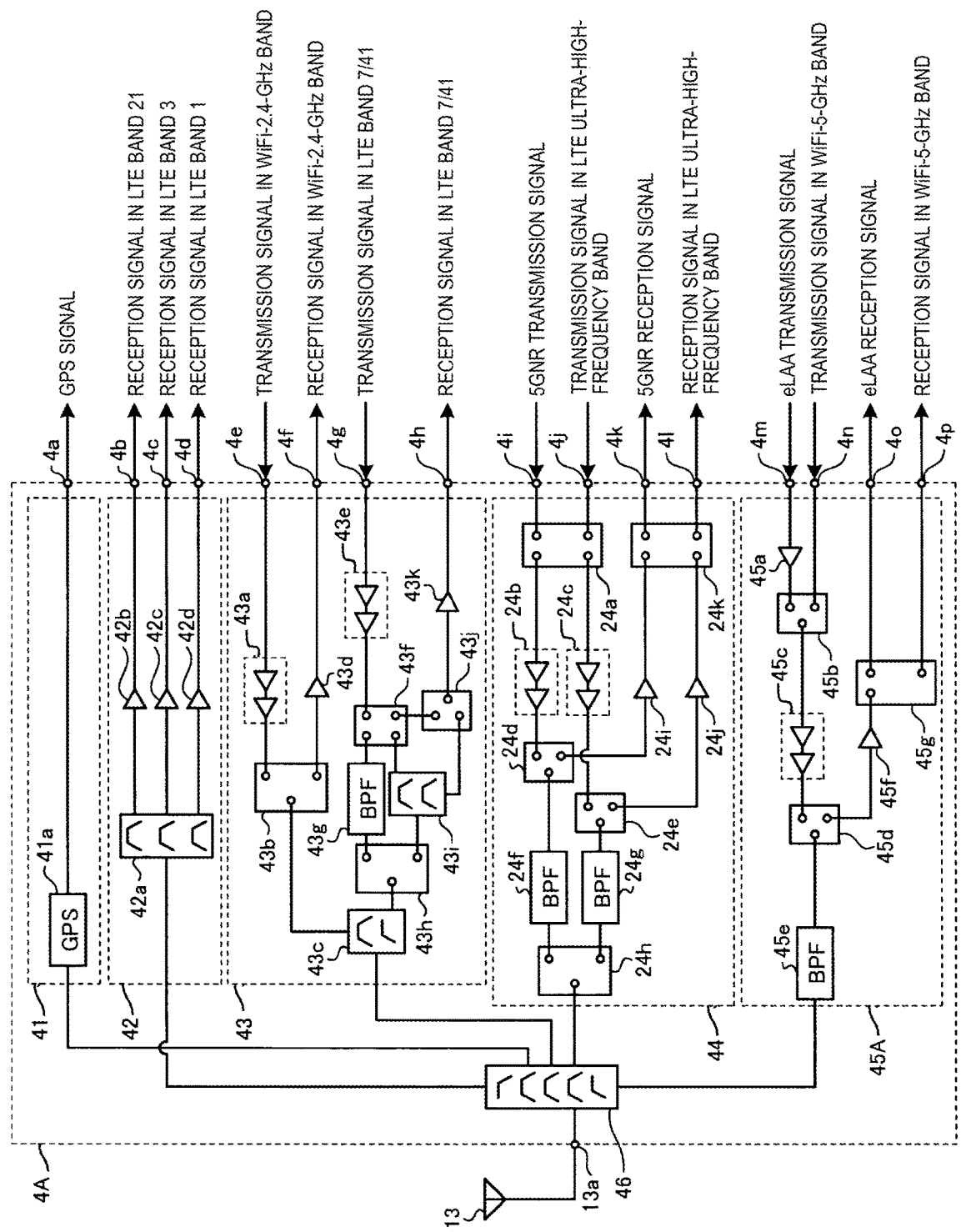
FIG. 7 illustrates the structure of a third circuit of a high-frequency-signal transceiver circuit according to a first modification to the first embodiment.
Figure 8:
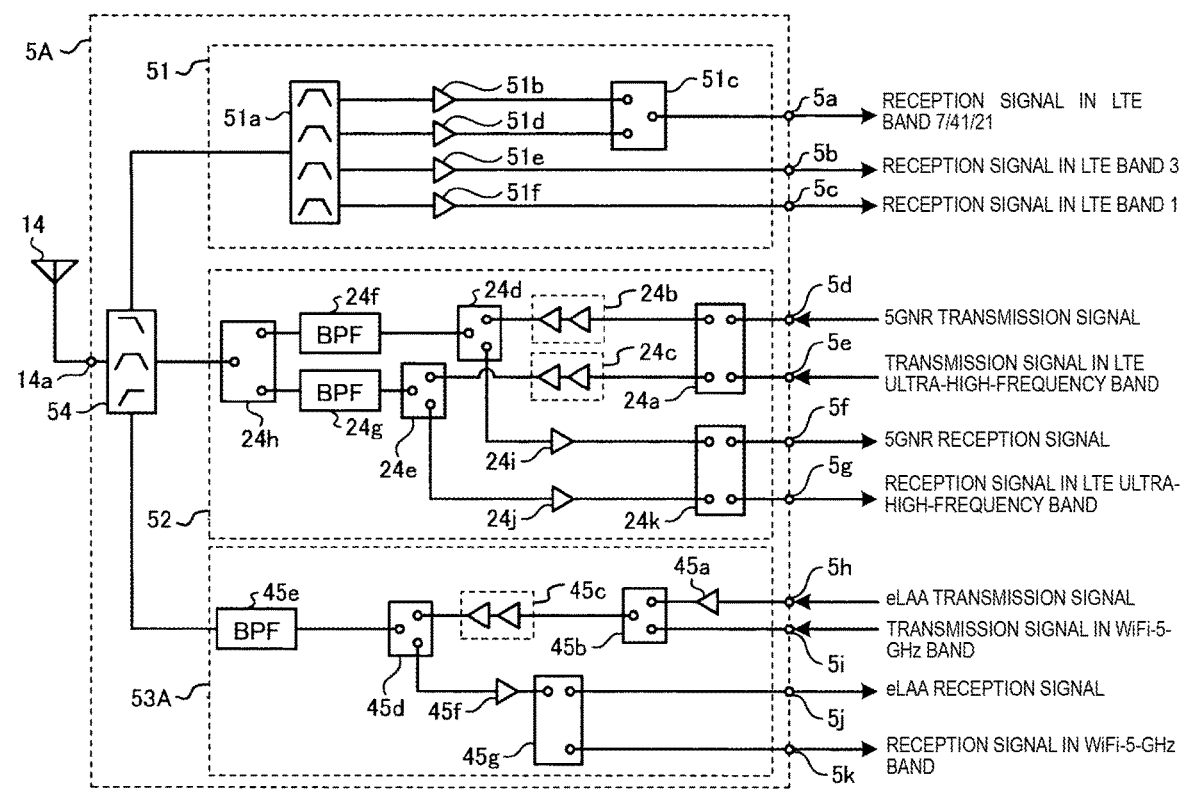
FIG. 8 illustrates the structure of a fourth circuit of the high-frequency-signal transceiver circuit according to the first modification to the first embodiment.

FIG. 7 illustrates the structure of a third circuit of a high-frequency-signal transceiver circuit according to a first modification to the first embodiment. FIG. 8 illustrates the structure of a fourth circuit of the high-frequency-signal transceiver circuit according to the first modification to the first embodiment. A first circuit and a second circuit of the high-frequency-signal transceiver circuit according to the first modification are the same as the first circuit 2 and the second circuit 3 of the high-frequency-signal transceiver circuit 1 according to the embodiment, and an illustration and description thereof are omitted.

Referring to FIG. 7, a third circuit 4A includes an eLAA-signal and WiFi-5-GHz-band-signal transceiver circuit 45A instead of the eLAA-signal and WiFi-5-GHz-band-signal transceiver circuit 45 (see FIG. 5). The eLAA-signal and WiFi-5-GHz-band-signal transceiver circuit 45A further includes a switch 45g unlike the eLAA-signal and WiFi-5-GHz-band-signal transceiver circuit 45.

The switch 45g is a single-port dual-throw switch.

When an eLAA signal is received, the switch 45d electrically connects the band pass filter 45e and the low-noise amplifier 45f to each other. The switch 45g electrically connects the low-noise amplifier 45f and the terminal 4o to each other. The band pass filter 45e receives the eLAA reception signal from the high pass filter of the multiplexer 46, passes the signal, and outputs the signal to the low-noise amplifier 45f via the switch 45d. The low-noise amplifier 45f amplifies the eLAA reception signal and outputs the amplified eLAA reception signal to the RFIC 101 via the switch 45g and the terminal 4o.

When a signal in the WiFi-5-GHz band is received, the switch 45d electrically connects the band pass filter 45e and the low-noise amplifier 45f to each other. The switch 45g electrically connects the low-noise amplifier 45f and the terminal 4p to each other. The band pass filter 45e receives the reception signal in the WiFi-5-GHz band from the high pass filter of the multiplexer 46, passes the signal, and outputs the signal to the low-noise amplifier 45f via the switch 45d. The low-noise amplifier 45f amplifies the reception signal in the WiFi-5-GHz band and outputs the amplified reception signal in the WiFi-5-GHz band to the RFIC 103 via the terminal 4p.

Referring to FIG. 8, a fourth circuit 5A includes an eLAA-signal and WiFi-5-GHz-band-signal transceiver circuit 53A instead of the eLAA-signal and WiFi-5-GHz-band-signal transceiver circuit 53 (see FIG. 6). The eLAA-signal and WiFi-5-GHz-band-signal transceiver circuit 53A further includes the switch 45g unlike the eLAA-signal and WiFi-5-GHz-band-signal transceiver circuit 53.

The operation of the eLAA-signal and WiFi-5-GHz-band-signal transceiver circuit 53A is the same as the operation of the eLAA-signal and WiFi-5-GHz-band-signal transceiver circuit 45A, and a description thereof is omitted.

In the eLAA-signal and WiFi-5-GHz-band-signal transceiver circuit 53 according to the first embodiment, an eLAA reception signal and a reception signal in the WiFi-5-GHz band are outputted from the terminals 5j and 5k. Accordingly, in the case where both of the eLAA signal and the signal in the WiFi-5-GHz band are received, it is necessary for the RFICs 101 and 103 to isolate the eLAA reception signal and the reception signal in the WiFi-5-GHz band from each other.

In the eLAA-signal and WiFi-5-GHz-band-signal transceiver circuit 53A according to the first modification, the switch 45g can isolate the eLAA reception signal and the reception signal in the WiFi-5-GHz band from each other. Accordingly, only the eLAA reception signal is outputted from the terminal 5j, and only the reception signal in the WiFi-5-GHz band is outputted from the terminal 5k. Consequently, the eLAA-signal and WiFi-5-GHz-band-signal transceiver circuit 53A can eliminate the need for the RFICs 101 and 103 to isolate the eLAA reception signal and the reception signal in the WiFi-5-GHz band from each other.

Second Modification

Figure 9:
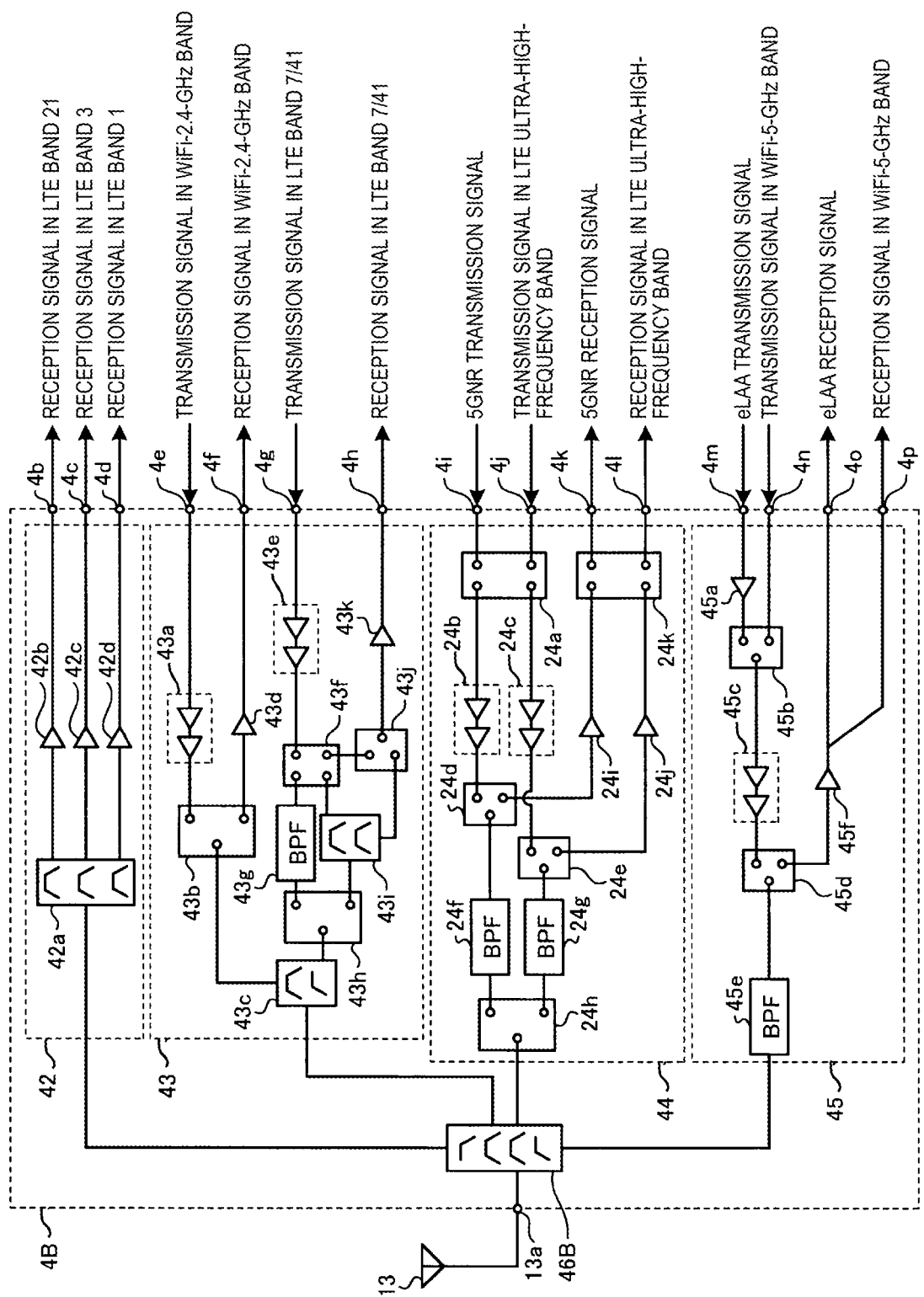
FIG. 9 illustrates the structure of a third circuit of a high-frequency-signal transceiver circuit according to a second modification to the first embodiment.
Figure 10:
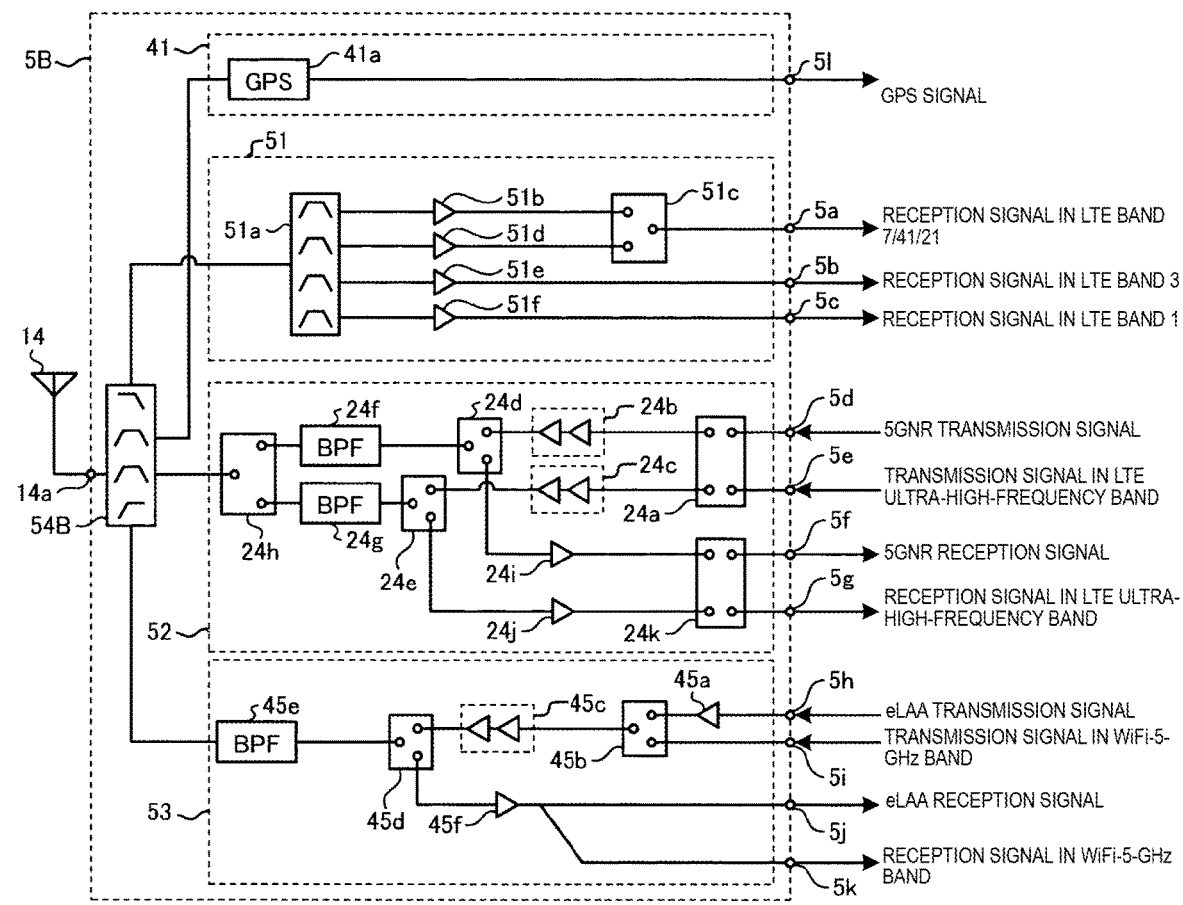
FIG. 10 illustrates the structure of a fourth circuit of the high-frequency-signal transceiver circuit according to the second modification to the first embodiment.

FIG. 9 illustrates the structure of a third circuit of a high-frequency-signal transceiver circuit according to a second modification to the first embodiment. FIG. 10 illustrates the structure of a fourth circuit of the high-frequency-signal transceiver circuit according to the second modification to the first embodiment. A first circuit and a second circuit of the high-frequency-signal transceiver circuit according to the second modification are the same as the first circuit 2 and the second circuit 3 of the high-frequency-signal transceiver circuit 1 according to the embodiment, and an illustration and description thereof are omitted.

Referring to FIG. 9, a third circuit 4B does not include the GPS-signal receiver circuit 41 unlike the third circuit 4 (see FIG. 5). Accordingly, a multiplexer 46B is a 1-to-4 quadplexer.

Referring to FIG. 10, a fourth circuit 5B includes the GPS-signal receiver circuit 41 unlike the fourth circuit 5 (see FIG. 6). Accordingly, a multiplexer 54B is a 1-to-4 quadplexer.

The multiplexer 54B includes a low pass filter, a first band pass filter, a second band pass filter, and a high pass filter. The low pass filter passes a signal in the LTE medium-and-high-frequency band. The first band pass filter passes a GPS signal. The second band pass filter passes a 5GNR signal and a signal in the LTE ultra-high-frequency band. The high pass filter passes an eLAA signal and a signal in the WiFi-5-GHz band.

The GPS-signal receiver circuit 41 includes the GPS receiver 41a. The GPS-signal receiver circuit 41 may be a module.

The GPS receiver 41a receives a GPS signal from the first band pass filter of the multiplexer 54B and outputs the signal to RFIC 104 via a terminal 5l.

Although the multiplexer 46 of the third circuit 4 (see FIG. 5) according to the first embodiment is a 1-to-5 multiplexer, the multiplexer 46B of the third circuit 4B according to the second modification can be a 1-to-4 multiplexer. Accordingly, the third circuit 4B enables the number of the filters of the multiplexer 46B to be decreased and enables attenuation of a signal to be reduced.

The first modification and the second modification may be combined. That is, the eLAA-signal and WiFi-5-GHz-band-signal transceiver circuit 45 of the third circuit 4B according to the second modification may include the switch 45g of the eLAA-signal and WiFi-5-GHz-band-signal transceiver circuit 45A of the third circuit 4A (see FIG. 7) according to the first modification. Similarly, the eLAA-signal and WiFi-5-GHz-band-signal transceiver circuit 53 of the fourth circuit 5B according to the second modification may include the switch 45g of the eLAA-signal and WiFi-5-GHz-band-signal transceiver circuit 53A of the fourth circuit 5A (see FIG. 8) according to the first modification.

Third Modification

Figure 11:
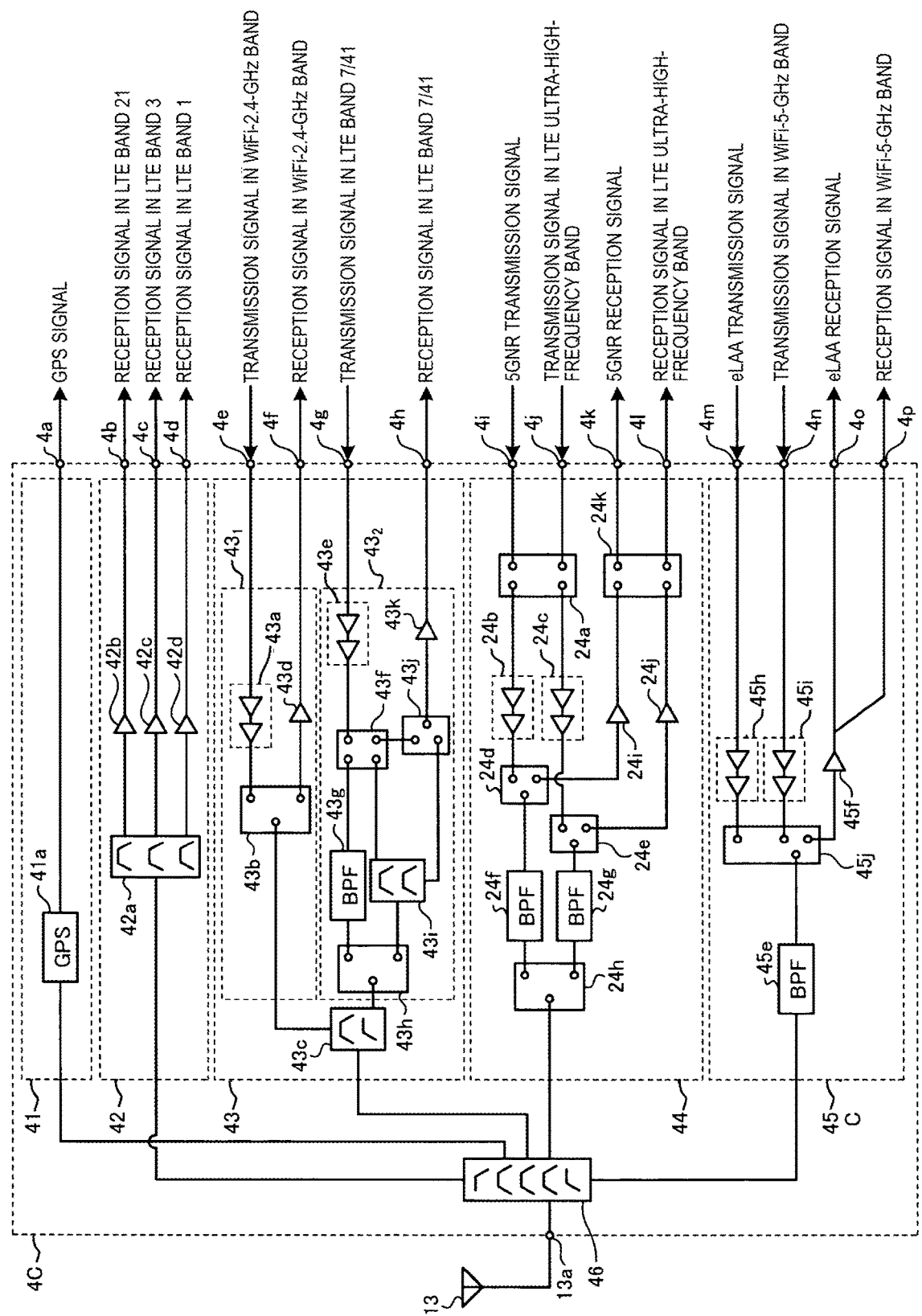
FIG. 11 illustrates the structure of a third circuit of a high-frequency-signal transceiver circuit according to a third modification to the first embodiment.

FIG. 11 illustrates the structure of a third circuit of a high-frequency-signal transceiver circuit according to a third modification to the first embodiment. A first circuit, a second circuit, and a fourth circuit of the high-frequency-signal transceiver circuit according to the third modification are the same as the first circuit 2, the second circuit 3, and the fourth circuit 5 of the high-frequency-signal transceiver circuit according to the embodiment, and an illustration and description thereof are omitted.

Referring to FIG. 11, the LTE-high-frequency-band-signal and WiFi-2.4-GHz-band-signal transceiver circuit 43 is divided into a WiFi-2.4-GHz-band-signal transceiver circuit $43_1$ and a LTE-high-frequency-band-signal transceiver circuit $43_2$.

The WiFi-2.4-GHz-band-signal transceiver circuit $43_1$ includes the power amplifier 43a, the switch 43b, and the low-noise amplifier 43d. The LTE-high-frequency-band-signal transceiver circuit $43_2$ includes the power amplifier 43e, the switch 43f, the band pass filter 43g, the switch 43h, the multiplexer 43i, the switch 43j, and the low-noise amplifier 43k.

A set of the WiFi-2.4-GHz-band-signal transceiver circuit $43_1$ and the LTE-high-frequency-band-signal transceiver circuit $43_2$ is a single module. The present disclosure, however, is not limited thereto. The WiFi-2.4-GHz-band-signal transceiver circuit $43_1$ and LTE-high-frequency-band-signal transceiver circuit $43_2$ may be different modules.

A third circuit 4C includes an eLAA-signal and WiFi-5-GHz-band-signal transceiver circuit 45C instead of the eLAA-signal and WiFi-5-GHz-band-signal transceiver circuit 45 (see FIG. 5).

The eLAA-signal and WiFi-5-GHz-band-signal transceiver circuit 45C may be a module.

The eLAA-signal and WiFi-5-GHz-band-signal transceiver circuit 45C includes a power amplifier 45h, a power amplifier 45i, and a switch 45j instead of the power amplifier 45a, the switch 45b, the power amplifier 45c, and the switch 45d unlike the eLAA-signal and WiFi-5-GHz-band-signal transceiver circuit 45.

The switch 45j is a single-port triple-throw switch.

When an eLAA signal is transmitted, the switch 45j electrically connects the power amplifier 45h and the band pass filter 45e to each other. The power amplifier 45h receives the eLAA transmission signal from the RFIC 101 via the terminal 4m, amplifies the signal, and outputs the amplified eLAA transmission signal to the band pass filter 45e via the switch 45j. The band pass filter 45e passes the eLAA transmission signal amplified by the power amplifier 45h and outputs the signal to the high pass filter of the multiplexer 46.

When a signal in the WiFi-5-GHz band is transmitted, the switch 45j electrically connects the power amplifier 45i and the band pass filter 45e to each other. The power amplifier 45i receives the transmission signal in the WiFi-5-GHz band from the RFIC 103 via the terminal 4n, amplifies the signal, and outputs the amplified transmission signal in the WiFi-5-GHz band to the band pass filter 45e via the switch 45j. The band pass filter 45e passes the transmission signal in the WiFi-5-GHz band amplified by the power amplifier 45i and outputs the signal to the high pass filter of the multiplexer 46.

When an eLAA signal is received or a signal in the WiFi-5-GHz band is received, the switch 45j electrically connects the band pass filter 45e and the low-noise amplifier 45f to each other. The band pass filter 45e receives the eLAA reception signal or the reception signal in the WiFi-5-GHz band from the high pass filter of the multiplexer 46, passes the signal, and outputs the signal to the low-noise amplifier 45f via the switch 45j. The low-noise amplifier 45f amplifies the eLAA reception signal and outputs the amplified eLAA reception signal to the RFIC 101 via the terminal 4o. The low-noise amplifier 45f amplifies the reception signal in the WiFi-5-GHz band and outputs the amplified reception signal in the WiFi-5-GHz band to the RFIC 103 via the terminal 4p.

In the third circuit 4 according to the first embodiment, the power amplifier 45c is used to amplify the eLAA transmission signal and the transmission signal in the WiFi-5-GHz band. Accordingly, there is a possibility that the third circuit 4 is not suitable to amplify the eLAA transmission signal and the transmission signal in the WiFi-5-GHz band.

In the third circuit 4C according to the third modification, the power amplifier 45h amplifies the eLAA transmission signal, and the power amplifier 45i amplifies the transmission signal in the WiFi-5-GHz band. Accordingly, the third circuit 4C is suitable to amplify the eLAA transmission signal and the transmission signal in the WiFi-5-GHz band.

The circuit structure of the eLAA-signal and WiFi-5-GHz-band-signal transceiver circuit 53 of the fourth circuit 5 may be the same as the circuit structure of the eLAA-signal and WiFi-5-GHz-band-signal transceiver circuit 45C of the third circuit 4C.

The first modification and the third modification may be combined. That is, the eLAA-signal and WiFi-5-GHz-band-signal transceiver circuit 45C of the third circuit 4C according to the third modification may include the switch 45g of the eLAA-signal and WiFi-5-GHz-band-signal transceiver circuit 45A of the third circuit 4A (see FIG. 7) according to the first modification.

The second modification and the third modification may be combined. That is, the third circuit 4C according to the third modification may not include the GPS-signal receiver circuit 41, and the fourth circuit 5 may include the GPS-signal receiver circuit 41.

Fourth Modification

Figure 12:
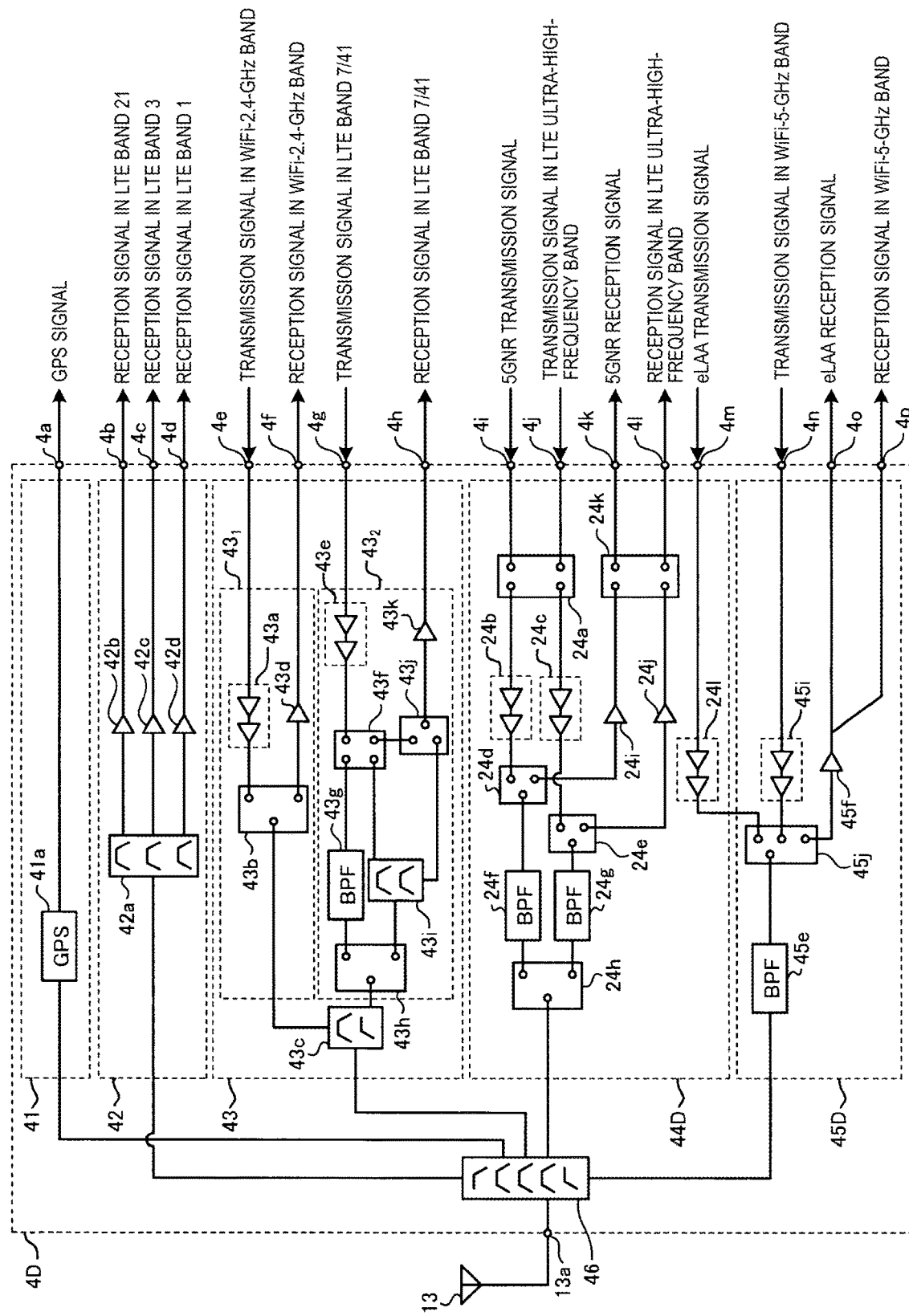
FIG. 12 illustrates the structure of a third circuit of a high-frequency-signal transceiver circuit according to a fourth modification to the first embodiment.

FIG. 12 illustrates the structure of a third circuit of a high-frequency-signal transceiver circuit according to a fourth modification to the first embodiment. A first circuit, a second circuit, and a fourth circuit of the high-frequency-signal transceiver circuit according to the fourth modification are the same as the first circuit 2, the second circuit 3, and the fourth circuit 5 of the high-frequency-signal transceiver circuit according to the embodiment, and an illustration and description thereof are omitted.

Referring to FIG. 12, a third circuit 4D includes a 5GNR-signal and LTE-ultra-high-frequency-band-signal transceiver circuit 44D instead of the 5GNR-signal and LTE-ultra-high-frequency-band-signal transceiver circuit 44 (see FIG. 5). The third circuit 4D includes an eLAA-signal and WiFi-5-GHz-band-signal transceiver circuit 45D instead of the eLAA-signal and WiFi-5-GHz-band-signal transceiver circuit 45 (see FIG. 5).

A set of the 5GNR-signal and LTE-ultra-high-frequency-band-signal transceiver circuit 44D and the eLAA-signal and WiFi-5-GHz-band-signal transceiver circuit 45D is a single module. The present disclosure, however, is not limited thereto. The 5GNR-signal and LTE-ultra-high-frequency-band-signal transceiver circuit 44D and the eLAA-signal and WiFi-5-GHz-band-signal transceiver circuit 45D may be different modules.

The 5GNR-signal and LTE-ultra-high-frequency-band-signal transceiver circuit 44D further includes a power amplifier 24l unlike the 5GNR-signal and LTE-ultra-high-frequency-band-signal transceiver circuit 44.

The eLAA-signal and WiFi-5-GHz-band-signal transceiver circuit 45D includes the power amplifier 45i and the switch 45j instead of the power amplifier 45a, the switch 45b, the power amplifier 45c, and the switch 45d unlike the eLAA-signal and WiFi-5-GHz-band-signal transceiver circuit 45.

When an eLAA signal is transmitted, the switch 45j electrically connects the power amplifier 24l and the band pass filter 45e to each other. The power amplifier 24l receives the eLAA transmission signal from the RFIC 101 via the terminal 4m, amplifies the signal, and outputs the amplified eLAA transmission signal to the band pass filter 45e via the switch 45j. The band pass filter 45e passes the eLAA transmission signal amplified by the power amplifier 24l and outputs the signal to the high pass filter of the multiplexer 46.

When a signal in the WiFi-5-GHz band is transmitted, the switch 45j electrically connects the power amplifier 45i and the band pass filter 45e to each other. The power amplifier 45i receives the transmission signal in the WiFi-5-GHz band from the RFIC 103 via the terminal 4n, amplifies the signal, and outputs the amplified transmission signal in the WiFi-5-GHz band to the band pass filter 45e via the switch 45j. The band pass filter 45e passes the transmission signal in the WiFi-5-GHz band amplified by the power amplifier 45i and outputs the signal to the high pass filter of the multiplexer 46.

When an eLAA signal is received, or a signal in the WiFi-5-GHz band is received, the switch 45j electrically connects the band pass filter 45e and the low-noise amplifier 45f to each other. The band pass filter 45e receives the eLAA reception signal or the reception signal in the WiFi-5-GHz band from the high pass filter of the multiplexer 46, passes the signal, and outputs the signal to the low-noise amplifier 45f via the switch 45j. The low-noise amplifier 45f amplifies the eLAA reception signal and outputs the amplified eLAA reception signal to the RFIC 101 via the terminal 4o. The low-noise amplifier 45f amplifies the reception signal in the WiFi-5-GHz band and outputs the amplified reception signal in the WiFi-5-GHz band to the RFIC 103 via the terminal 4p.

In the third circuit 4 according to the first embodiment, the power amplifier 45c is used to amplify the eLAA transmission signal and the transmission signal in the WiFi-5-GHz band. Accordingly, there is a possibility that the third circuit 4 is not suitable to amplify the eLAA transmission signal and the transmission signal in the WiFi-5-GHz band.

In the third circuit 4D according to the fourth modification, the power amplifier 24l amplifies the eLAA transmission signal, and the power amplifier 45i amplifies the transmission signal in the WiFi-5-GHz band. Accordingly, the third circuit 4D is suitable to amplify the eLAA transmission signal and the transmission signal in the WiFi-5-GHz band.

The circuit structure of the 5GNR-signal and LTE-ultra-high-frequency-band-signal transceiver circuit 52 of the fourth circuit 5 may be the same as the circuit structure of the 5GNR-signal and LTE-ultra-high-frequency-band-signal transceiver circuit 44D of the third circuit 4D. Similarly, the circuit structure of the eLAA-signal and WiFi-5-GHz-band-signal transceiver circuit 53 of the fourth circuit 5 may be the same as the circuit structure of the eLAA-signal and WiFi-5-GHz-band-signal transceiver circuit 45D of the third circuit 4D.

The first modification and the fourth modification may be combined. That is, the eLAA-signal and WiFi-5-GHz-band-signal transceiver circuit 45D of the third circuit 4D according to the fourth modification may include the switch 45g of the eLAA-signal and WiFi-5-GHz-band-signal transceiver circuit 45A of the third circuit 4A (see FIG. 7) according to the first modification.

The second modification and the fourth modification may be combined. That is, the third circuit 4D according to the fourth modification may not include the GPS-signal receiver circuit 41, and the fourth circuit 5 may include the GPS-signal receiver circuit 41.

Fifth Modification

Figure 13:
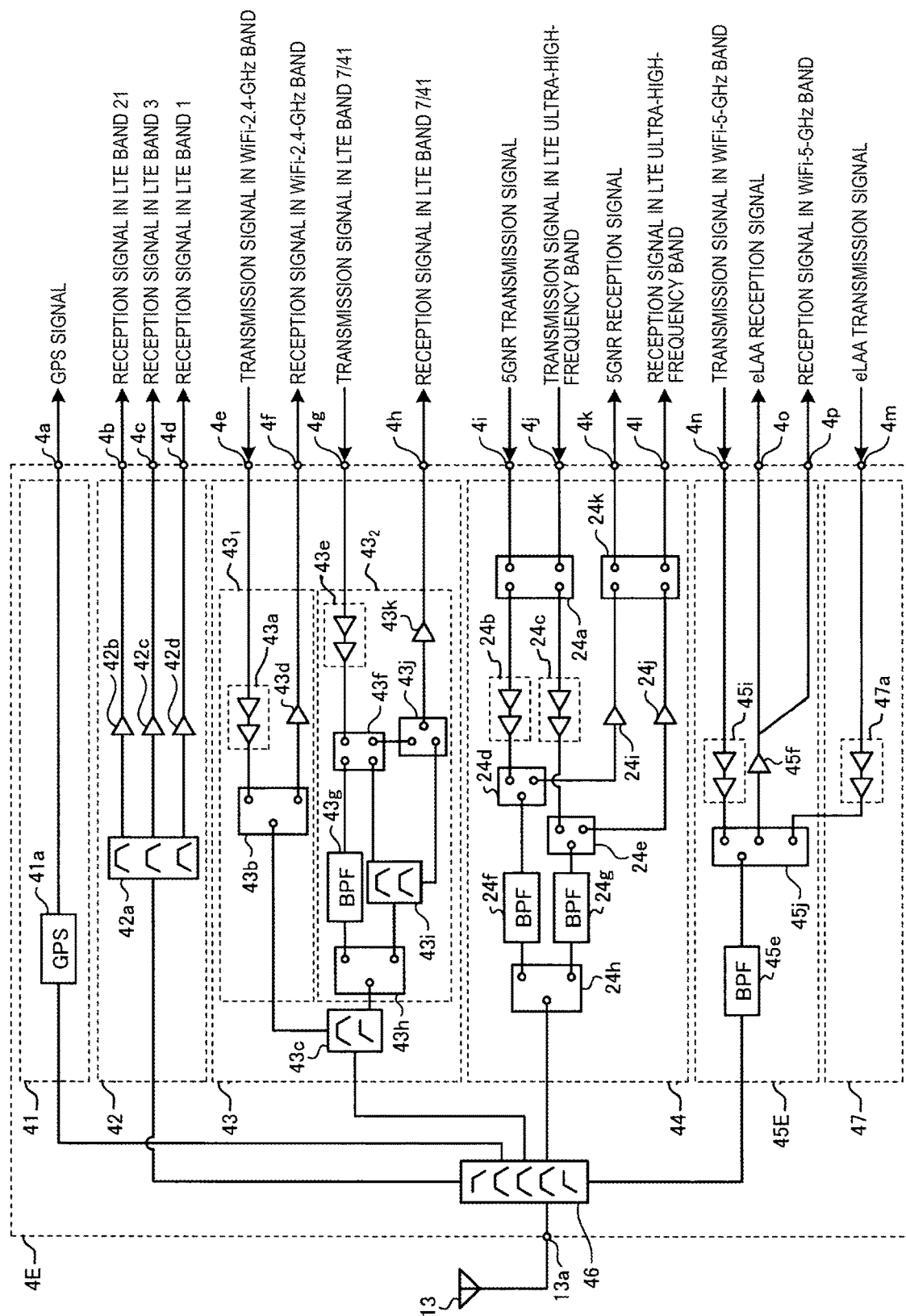
FIG. 13 illustrates the structure of a third circuit of a high-frequency-signal transceiver circuit according to a fifth modification to the first embodiment.

FIG. 13 illustrates the structure of a third circuit of a high-frequency-signal transceiver circuit according to a fifth modification to the embodiment. A first circuit, a second circuit, and a fourth circuit of the high-frequency-signal transceiver circuit according to the fifth modification are the same as the first circuit 2, the second circuit 3, and the fourth circuit 5 of the high-frequency-signal transceiver circuit according to the embodiment, and an illustration and description thereof are omitted.

Referring to FIG. 13, a third circuit 4E includes an eLAA-signal and WiFi-5-GHz-band-signal transceiver circuit 45E instead of the eLAA-signal and WiFi-5-GHz-band-signal transceiver circuit 45 (see FIG. 5). The third circuit 4E further includes an eLAA-transmission-signal-amplifying circuit 47.

A set of the eLAA-signal and WiFi-5-GHz-band-signal transceiver circuit 45E and the eLAA-transmission-signal-amplifying circuit 47 is a single module. The present disclosure, however, is not limited thereto. The eLAA-signal and WiFi-5-GHz-band-signal transceiver circuit 45E and the eLAA-transmission-signal-amplifying circuit 47 may be different modules.

The eLAA-signal and WiFi-5-GHz-band-signal transceiver circuit 45E includes the power amplifier 45i and the switch 45j instead of the power amplifier 45a, the switch 45b, the power amplifier 45c, and the switch 45d unlike the eLAA-signal and WiFi-5-GHz-band-signal transceiver circuit 45.

The eLAA-transmission-signal-amplifying circuit 47 includes a power amplifier 47a.

When an eLAA signal is transmitted, the switch 45j electrically connects the power amplifier 47a and the band pass filter 45e to each other. The power amplifier 47a receives the eLAA transmission signal from the RFIC 101 via the terminal 4m, amplifies the signal, and outputs the amplified eLAA transmission signal to the band pass filter 45e via the switch 45j. The band pass filter 45e passes the eLAA transmission signal amplified by the power amplifier 47a and outputs the signal to the high pass filter of the multiplexer 46.

When a signal in the WiFi-5-GHz band is transmitted, the switch 45j electrically connects the power amplifier 45i and the band pass filter 45e to each other. The power amplifier 45i receives the transmission signal in the WiFi-5-GHz band from the RFIC 103 via the terminal 4n, amplifies the signal, and outputs the amplified transmission signal in the WiFi-5-GHz band to the band pass filter 45e via the switch 45j. The band pass filter 45e passes the transmission signal in the WiFi-5-GHz band amplified by the power amplifier 45*i* and outputs the signal to the high pass filter of the multiplexer 46.

When an eLAA signal is received, or a signal in the WiFi-5-GHz band is received, the switch 45*j* electrically connects the band pass filter 45*e* and the low-noise amplifier 45*f* to each other. The band pass filter 45*e* receives the eLAA reception signal or the reception signal in the WiFi-5-GHz band from the high pass filter of the multiplexer 46, passes the signal, and outputs the signal to the low-noise amplifier 45*f* via the switch 45*j*. The low-noise amplifier 45*f* amplifies the eLAA reception signal and outputs the amplified eLAA reception signal to the RFIC 101 via the terminal 4*o*. The low-noise amplifier 45*f* amplifies the reception signal in the WiFi-5-GHz band and outputs the amplified reception signal in the WiFi-5-GHz band to the RFIC 103 via the terminal 4*p*.

In the third circuit 4 according to the first embodiment, the power amplifier 45*c* is used to amplify the eLAA transmission signal and the transmission signal in the WiFi-5-GHz band. Accordingly, there is a possibility that the third circuit 4 is not suitable to amplify the eLAA transmission signal and the transmission signal in the WiFi-5-GHz band.

In the third circuit 4E according to the fifth modification, the power amplifier 47*a* amplifies the eLAA transmission signal, and the power amplifier 45*i* amplifies the transmission signal in the WiFi-5-GHz band. Accordingly, the third circuit 4E is suitable to amplify the eLAA transmission signal and the transmission signal in the WiFi-5-GHz band.

The circuit structure of the eLAA-signal and WiFi-5-GHz-band-signal transceiver circuit 53 of the fourth circuit 5 may be the same as the circuit structure of the eLAA-signal and WiFi-5-GHz-band-signal transceiver circuit 45E of the third circuit 4E. Similarly, the fourth circuit 5 may further include the eLAA-transmission-signal-amplifying circuit 47 of the third circuit 4E.

The first modification and the fifth modification may be combined. That is, the eLAA-signal and WiFi-5-GHz-band-signal transceiver circuit 45E of the third circuit 4E according to the fifth modification may include the switch 45*g* of the eLAA-signal and WiFi-5-GHz-band-signal transceiver circuit 45A of the third circuit 4A (see FIG. 7) according to the first modification.

The second modification and the fifth modification may be combined. That is, the third circuit 4E according to the fifth modification may not include the GPS-signal receiver circuit 41, and the fourth circuit 5 may include the GPS-signal receiver circuit 41.

According to the present disclosure, a 4×4 MIMO structure of 5GNR is described. In the case of a 2×2 MIMO structure of 5GNR, two circuits of the four circuits supporting 5GNR can be removed.

Second Embodiment

Figure 14:
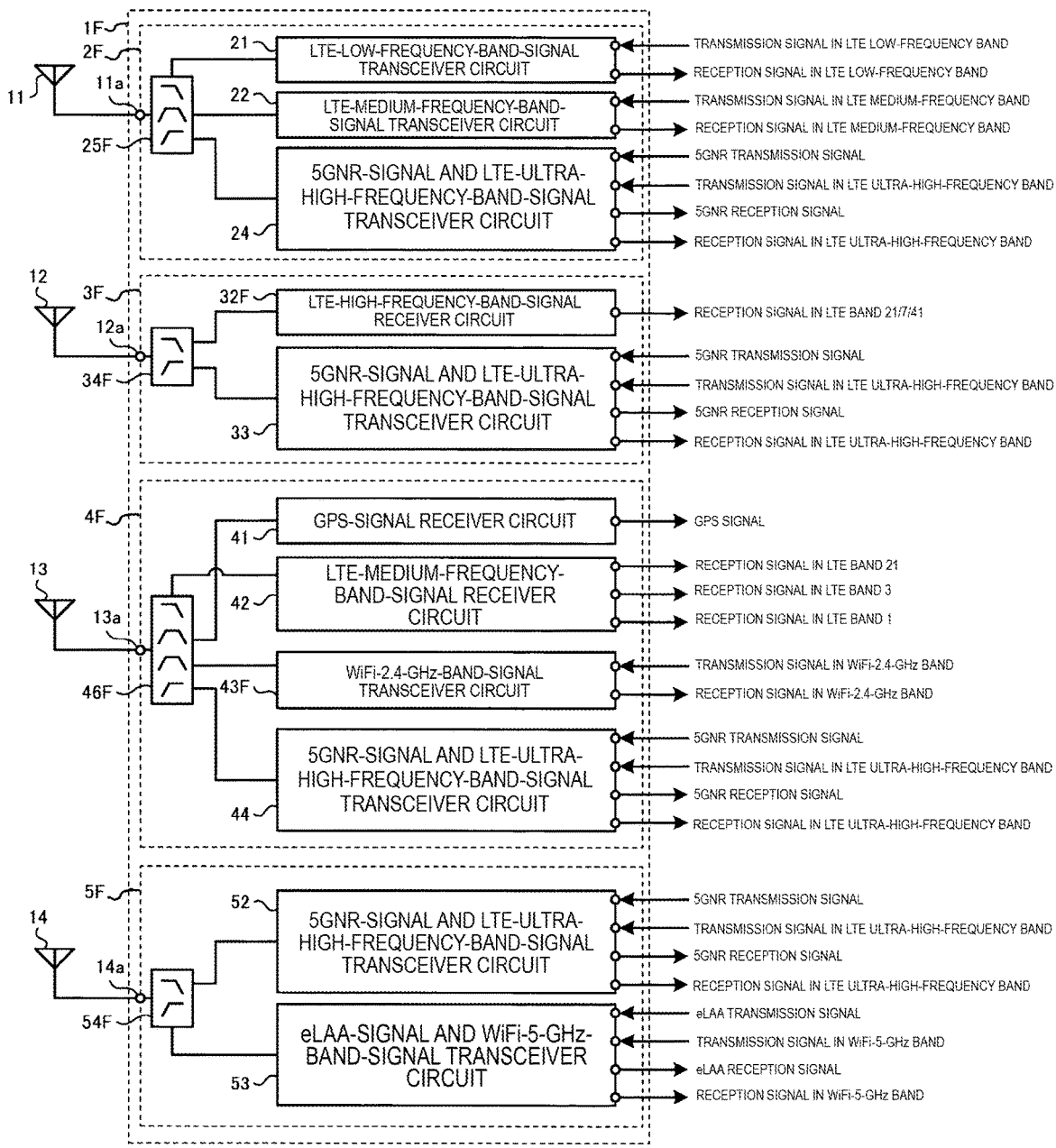
FIG. 14 illustrates the structure of a high-frequency-signal transceiver circuit according to a second embodiment.

FIG. 14 illustrates the structure of a high-frequency-signal transceiver circuit according to a second embodiment. Components according to the second embodiment which are the same as those according to the first embodiment and the first to fifth modifications are designated by like reference numbers, and a description thereof is omitted.

A high-frequency-signal transceiver circuit 1F includes a first circuit 2F instead of the first circuit 2.

The first circuit 2F includes the LTE-low-frequency-band-signal transceiver circuit 21, the LTE-medium-frequency-band-signal transceiver circuit 22, the 5GNR-signal and LTE-ultra-high-frequency-band-signal transceiver circuit 24, and a multiplexer 25F. The first circuit 2F does not include the LTE-high-frequency-band-signal transceiver circuit 23 unlike the first circuit 2.

The multiplexer 25F is a 1-to-3 triplexer. The multiplexer 25F electrically connects the first antenna terminal 11*a* and circuits such as the LTE-low-frequency-band-signal transceiver circuit 21, the LTE-medium-frequency-band-signal transceiver circuit 22, and the 5GNR-signal and LTE-ultra-high-frequency-band-signal transceiver circuit 24 to each other.

The multiplexer 25F includes a low pass filter, a band pass filter, and a high pass filter. The low pass filter passes a signal in the LTE low-frequency band. The band pass filter passes a signal in the LTE medium-frequency band. The high pass filter passes a 5GNR signal and a signal in the LTE ultra-high-frequency band.

The high-frequency-signal transceiver circuit 1F includes a second circuit 3F instead of the second circuit 3.

The second circuit 3F includes a LTE-high-frequency-band-signal receiver circuit 32F, the 5GNR-signal and LTE-ultra-high-frequency-band-signal transceiver circuit 33, and a multiplexer 34F. The second circuit 3F does not include the LTE-low-frequency-band-signal receiver circuit 31 unlike the second circuit 3.

The multiplexer 34F is a 1-to-2 diplexer. The multiplexer 34F electrically connects the second antenna terminal 12*a* and circuits such as the LTE-high-frequency-band-signal receiver circuit 32F and the 5GNR-signal and LTE-ultra-high-frequency-band-signal transceiver circuit 33 to each other.

The multiplexer 34F includes a low pass filter and a high pass filter. The low pass filter passes a signal in the LTE high-frequency band. The high pass filter passes a 5GNR signal and a signal in the LTE ultra-high-frequency band.

The high-frequency-signal transceiver circuit 1F includes a third circuit 4F instead of the third circuit 4.

The third circuit 4F includes the GPS-signal receiver circuit 41, the LTE-medium-frequency-band-signal receiver circuit 42, a WiFi-2.4-GHz-band-signal transceiver circuit 43F, the 5GNR-signal and LTE-ultra-high-frequency-band-signal transceiver circuit 44, and a multiplexer 46F. The third circuit 4F does not include the eLAA-signal and WiFi-5-GHz-band-signal transceiver circuit 45 unlike the third circuit 4.

The multiplexer 46F is a 1-to-4 quadplexer. The multiplexer 46F electrically connects the third antenna terminal 13*a* and circuits such as the GPS-signal receiver circuit 41, the LTE-medium-frequency-band-signal receiver circuit 42, the WiFi-2.4-GHz-band-signal transceiver circuit 43F, and the 5GNR-signal and LTE-ultra-high-frequency-band-signal transceiver circuit 44 to each other.

The multiplexer 46F includes a low pass filter, a first band pass filter, a second band pass filter, and a high pass filter. The low pass filter passes a signal in the LTE medium-frequency band. The first band pass filter passes a GPS signal.

The second band pass filter passes a signal in the WiFi-2.4-GHz band. The high pass filter passes a 5GNR signal and a signal in the LTE ultra-high-frequency band.

The high-frequency-signal transceiver circuit 1F includes a fourth circuit 5F instead of the fourth circuit 5.

The fourth circuit 5F includes the 5GNR-signal and LTE-ultra-high-frequency-band-signal transceiver circuit 52, the eLAA-signal and WiFi-5-GHz-band-signal transceiver circuit 53, and a multiplexer 54F. The fourth circuit 5F does not include the LTE-medium-and-high-frequency-band-signal receiver circuit 51 unlike the fourth circuit 5.

The multiplexer 54F is a 1-to-2 diplexer. The multiplexer 54F electrically connects the fourth antenna terminal 14a and circuits such as the 5GNR-signal and LTE-ultra-high-frequency-band-signal transceiver circuit 52 and the eLAA-signal and WiFi-5-GHz-band-signal transceiver circuit 53 to each other.

The multiplexer 54F includes a low pass filter and a high pass filter. The low pass filter passes a 5GNR signal and a signal in the LTE ultra-high-frequency band. The high pass filter passes an eLAA signal and a signal in the WiFi-5-GHz band.

Figure 15:
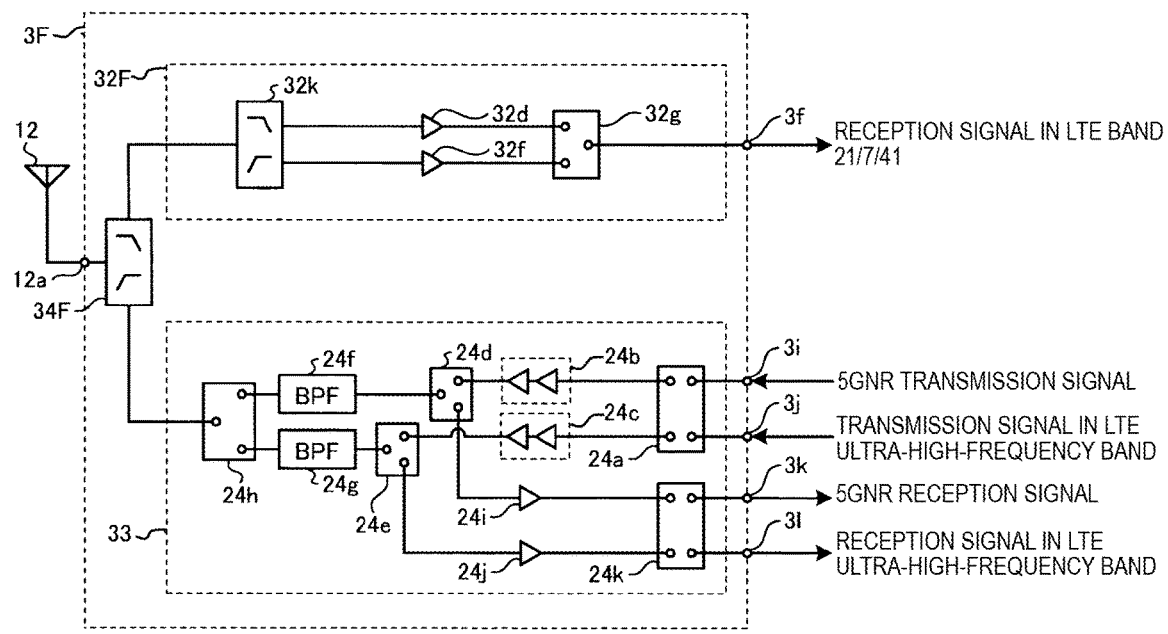
FIG. 15 illustrates the structure of a second circuit of the high-frequency-signal transceiver circuit according to the second embodiment.

FIG. 15 illustrates the structure of the second circuit of the high-frequency-signal transceiver circuit according to the second embodiment.

The LTE-high-frequency-band-signal receiver circuit 32F includes none of the multiplexer 32a, the low-noise amplifiers 32b, 32c, and 32j, the switches 32e, 32g, and 32i, and the power amplifier 32h unlike the LTE-medium-and-high-frequency-band-signal receiver and WiFi-2.4-GHz-band-signal transceiver circuit 32. Instead, the LTE-high-frequency-band-signal receiver circuit 32F includes a multiplexer 32k.

The multiplexer 32k is a 1-to-2 diplexer. The multiplexer 32k electrically connects the low pass filter of the multiplexer 34F and the low-noise amplifiers 32d and 32f to each other.

The multiplexer 32k includes a low pass filter and a high pass filter. The low pass filter passes a reception signal in the LTE band 21. The high pass filter passes a reception signal in the LTE bands 7 and 41.

Figure 16:
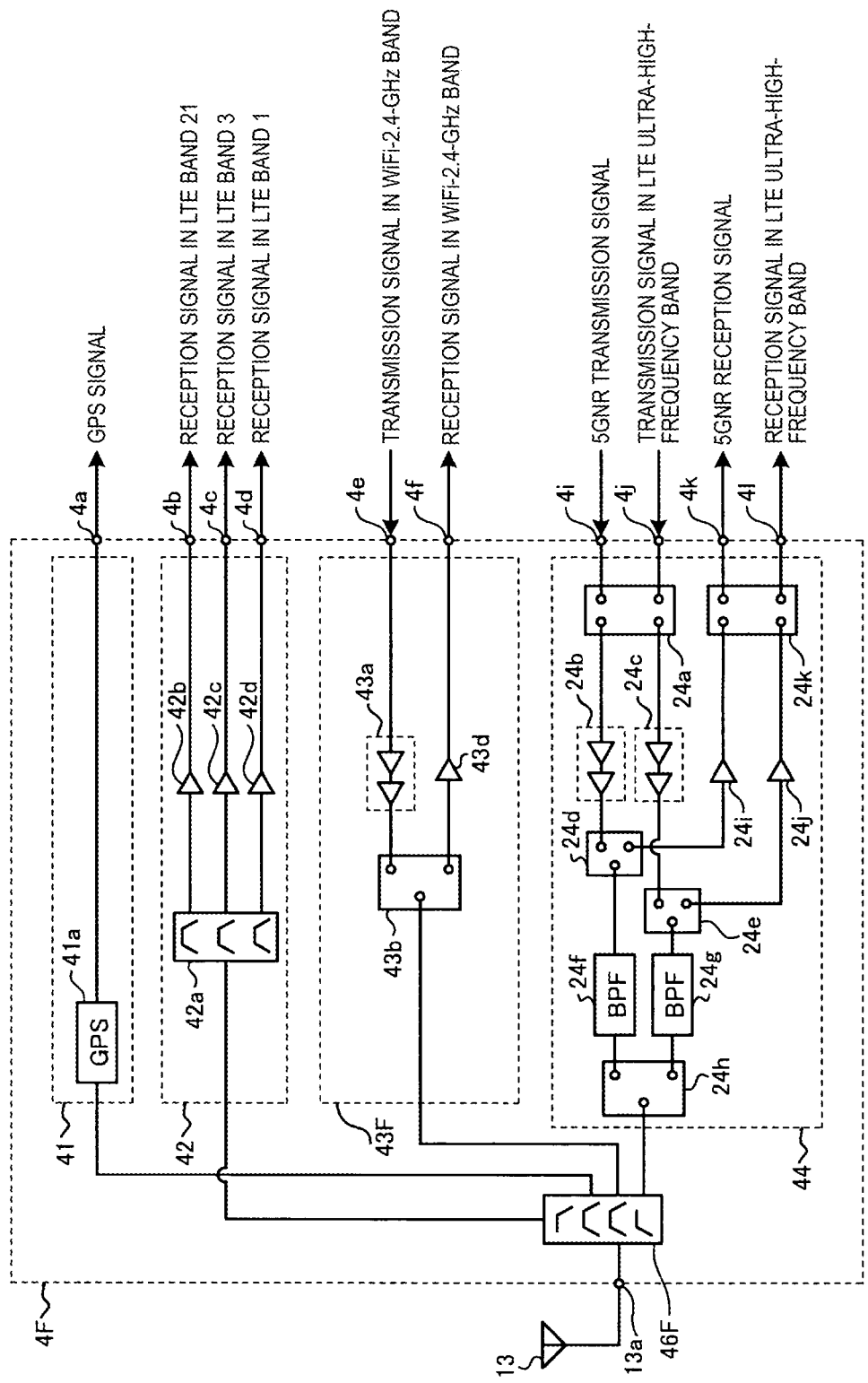
FIG. 16 illustrates the structure of a third circuit of the high-frequency-signal transceiver circuit according to the second embodiment.

FIG. 16 illustrates the structure of the third circuit of the high-frequency-signal transceiver circuit according to the second embodiment.

The WiFi-2.4-GHz-band-signal transceiver circuit 43F includes none of the power amplifier 43e, the switches 43f, 43h, and 43j, the multiplexers 43c and 43i, the low-noise amplifier 43k, and the band pass filter 43g unlike the LTE-high-frequency-band-signal and WiFi-2.4-GHz-band-signal transceiver circuit 43. The switch 43b is electrically connected to the second band pass filter of the multiplexer 46F.

The high-frequency-signal transceiver circuit 1F according to the second embodiment achieves the same effects as in the high-frequency-signal transceiver circuit 1 according to the first embodiment.

Third Embodiment

Figure 17:
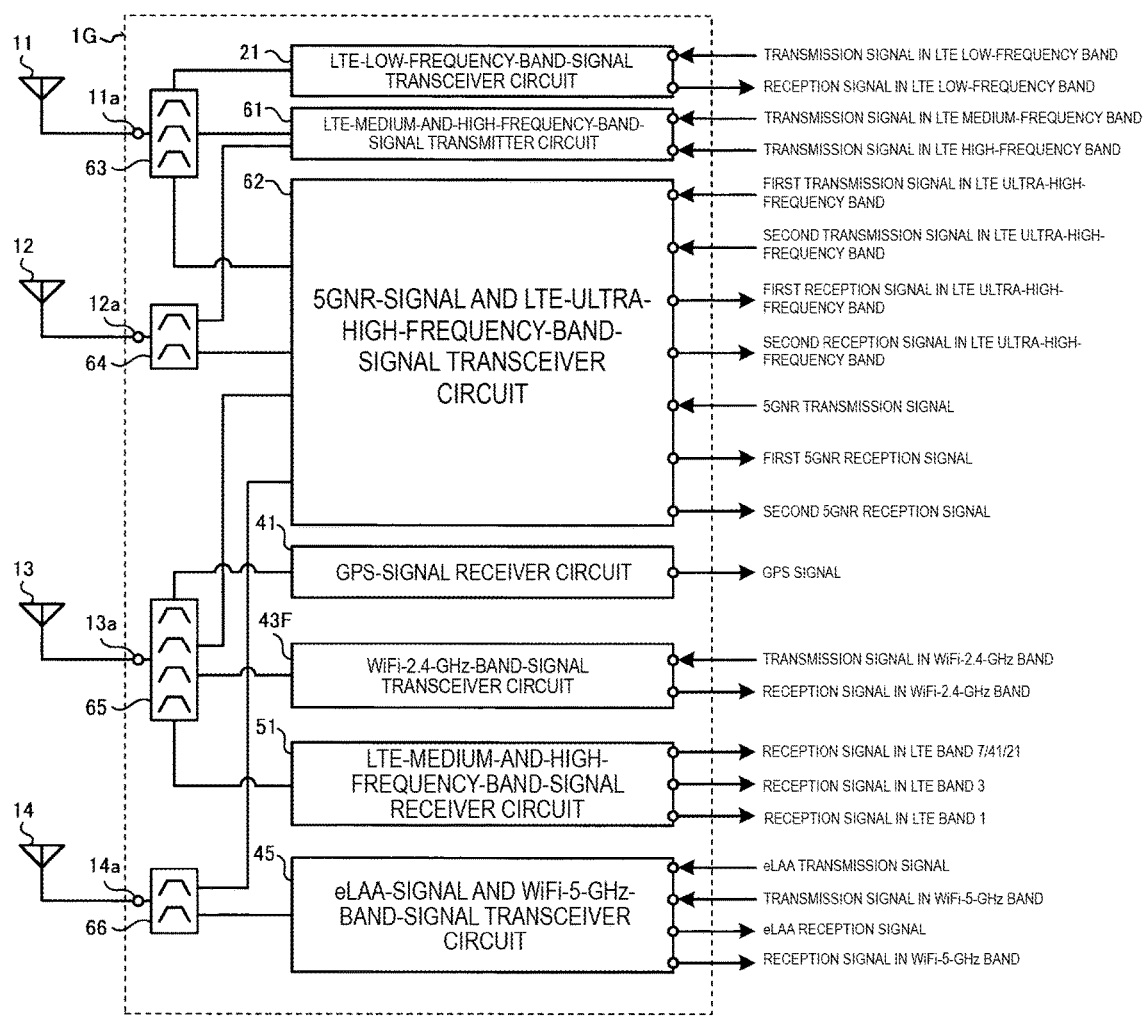
FIG. 17 illustrates the structure of a high-frequency-signal transceiver circuit according to a third embodiment.

FIG. 17 illustrates the structure of a high-frequency-signal transceiver circuit according to a third embodiment. Components according to the third embodiment which are the same as those according to the first embodiment, the first to fifth modifications, and the second embodiment are designated by like reference numbers, and a description thereof is omitted.

A high-frequency-signal transceiver circuit 1G includes the LTE-low-frequency-band-signal transceiver circuit 21, a LTE-medium-and-high-frequency-band-signal transmitter circuit 61, a 5GNR-signal and LTE-ultra-high-frequency-band-signal transceiver circuit 62, the GPS-signal receiver circuit 41, the WiFi-2.4-GHz-band-signal transceiver circuit 43F, the LTE-medium-and-high-frequency-band-signal receiver circuit 51, the eLAA-signal and WiFi-5-GHz-band-signal transceiver circuit 45, and multiplexers 63 to 66.

The 5GNR-signal and LTE-ultra-high-frequency-band-signal transceiver circuit 62 corresponds to the "first circuit" according to the present disclosure. The GPS-signal receiver circuit 41 corresponds to the "second circuit" according to the present disclosure. The LTE-low-frequency-band-signal transceiver circuit 21 corresponds to the "third circuit" according to the present disclosure. The LTE-medium-and-high-frequency-band-signal transmitter circuit 61 corresponds to the "fourth circuit" according to the present disclosure. The WiFi-2.4-GHz-band-signal transceiver circuit 43F corresponds to a "fifth circuit" according to the present disclosure. The LTE-medium-and-high-frequency-band-signal receiver circuit 51 corresponds to a "sixth circuit" according to the present disclosure.

The multiplexer 63 is a 1-to-3 triplexer. The multiplexer 63 electrically connects the first antenna terminal 11a and circuits such as the LTE-low-frequency-band-signal transceiver circuit 21, the LTE-medium-and-high-frequency-band-signal transmitter circuit 61, and the 5GNR-signal and LTE-ultra-high-frequency-band-signal transceiver circuit 62 to each other.

The multiplexer 63 includes first to third band pass filters. The first band pass filter passes a signal in the LTE low-frequency band. The second band pass filter passes a signal in the LTE medium-and-high-frequency band. The third band pass filter passes a 5GNR signal and a signal in the LTE ultra-high-frequency band.

The multiplexer 64 is a 1-to-2 diplexer. The multiplexer 64 electrically connects the second antenna terminal 12a and circuits such as the LTE-medium-and-high-frequency-band-signal transmitter circuit 61 and the 5GNR-signal and LTE-ultra-high-frequency-band-signal transceiver circuit 62 to each other.

The multiplexer 64 includes first and second band pass filters. The first band pass filter passes a signal in the LTE medium-and-high-frequency band. The second band pass filter passes a 5GNR signal and a signal in the LTE ultra-high-frequency band.

The multiplexer 65 is a 1-to-4 quadplexer. The multiplexer 65 electrically connects the third antenna terminal 13a and circuits such as the GPS-signal receiver circuit 41, the 5GNR-signal and LTE-ultra-high-frequency-band-signal transceiver circuit 62, the WiFi-2.4-GHz-band-signal transceiver circuit 43F, and the LTE-medium-and-high-frequency-band-signal receiver circuit 51 to each other.

The multiplexer 65 includes first to fourth band pass filters. The first band pass filter passes a GPS signal. The second band pass filter passes a 5GNR signal and a signal in the LTE ultra-high-frequency band. The third band pass filter passes a signal in the WiFi-2.4-GHz band. The fourth band pass filter passes a signal in the LTE medium-and-high-frequency band.

The multiplexer 66 is a 1-to-2 diplexer. The multiplexer 66 electrically connects the fourth antenna terminal 14a and circuits such as the 5GNR-signal and LTE-ultra-high-frequency-band-signal transceiver circuit 62 and the eLAA-signal and WiFi-5-GHz-band-signal transceiver circuit 45 to each other.

The multiplexer 66 includes first and second band pass filters. The first band pass filter passes a 5GNR signal and a signal in the LTE ultra-high-frequency band. The second band pass filter passes an eLAA signal and a signal in the WiFi-5-GHz band.

Figure 18:
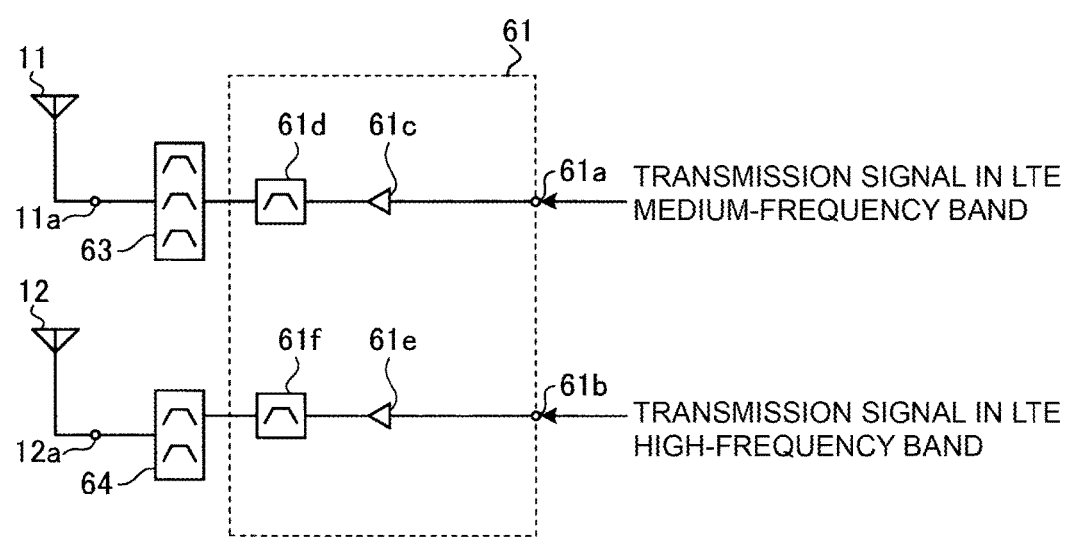
FIG. 18 illustrates the structure of a LTE-medium-and-high-frequency-band-signal transmitter circuit according to the third embodiment.

FIG. 18 illustrates the structure of the LTE-medium-and-high-frequency-band-signal transmitter circuit according to the third embodiment.

The LTE-medium-and-high-frequency-band-signal transmitter circuit 61 includes power amplifiers 61c and 61e and band pass filters 61d and 61f.

The power amplifier 61c receives a transmission signal in the LTE medium-frequency band from the RFIC 101 via a terminal 61a and outputs the signal to the band pass filter 61d. The band pass filter 61d receives the transmission signal in the LTE medium-frequency band from the power amplifier 61c, passes the signal, and outputs the signal to the second band pass filter of the multiplexer 63.

The power amplifier 61e receives a transmission signal in the LTE high-frequency band from the RFIC 101 via a terminal 61b and outputs the signal to the band pass filter 61f. The band pass filter 61f receives the transmission signal in the LTE high-frequency band from the power amplifier 61e, passes the signal, and outputs the signal to the first band pass filter of the multiplexer 64.

Figure 19:
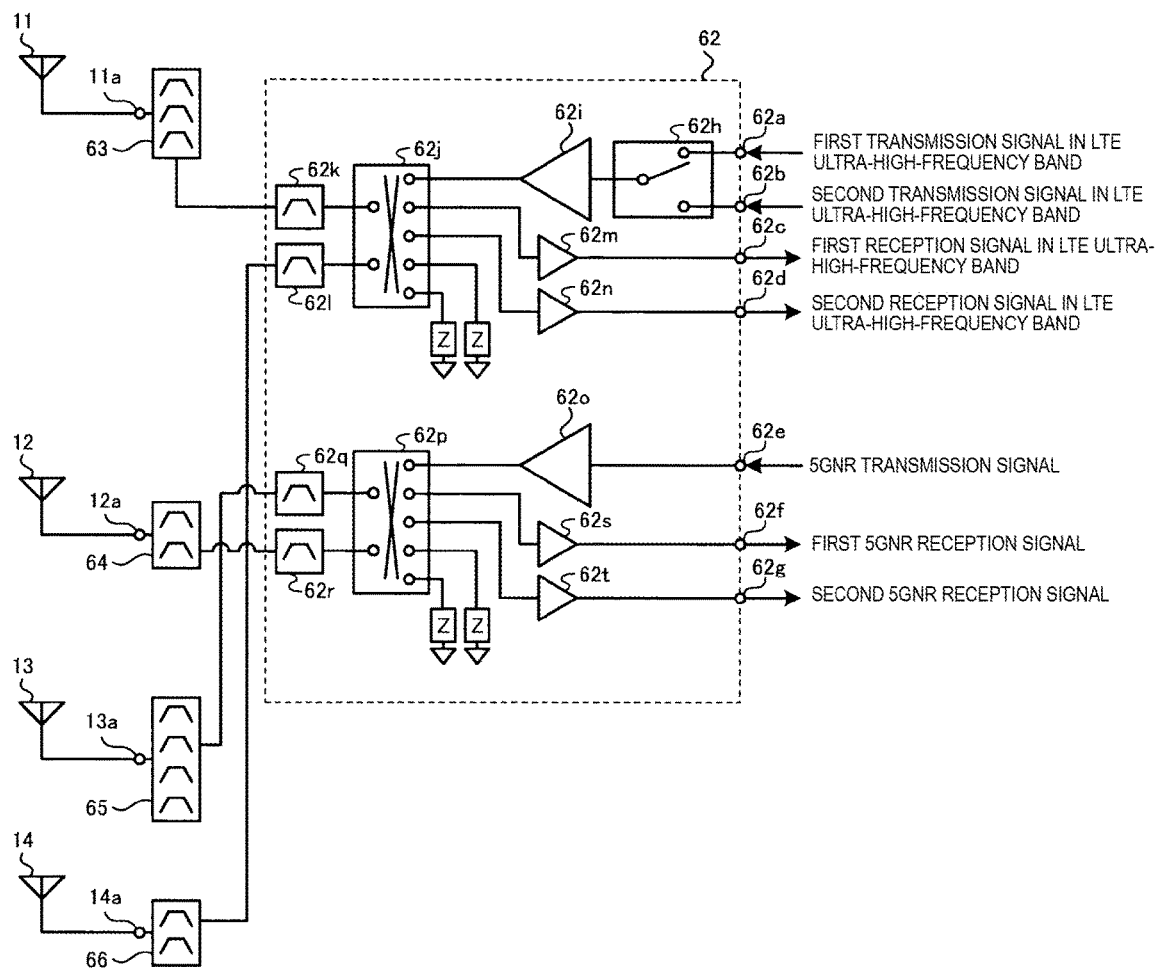
FIG. 19 illustrates the structure of a 5GNR-signal and LTE-ultra-high-frequency-band-signal transceiver circuit according to the third embodiment.

FIG. 19 illustrates the structure of the 5GNR-signal and LTE-ultra-high-frequency-band-signal transceiver circuit according to the third embodiment.

The 5GNR-signal and LTE-ultra-high-frequency-band-signal transceiver circuit 62 includes switches 62h, 62j, and 62p, power amplifiers 62i and 62o, band pass filters 62k, 62l, 62q, and 62r, and low-noise amplifiers 62m, 62n, 62s, and 62t.

When a first transmission signal in the LTE ultra-high-frequency band is transmitted, the switch 62h electrically connects a terminal 62a and the power amplifier 62i to each other. The switch 62j electrically connects the power amplifier 62i and the band pass filter 62k to each other. The power amplifier 62i receives the first transmission signal in the LTE ultra-high-frequency band from the RFIC 101 via the terminal 62a and the switch 62h, amplifies the signal, and outputs the amplified first transmission signal in the LTE ultra-high-frequency band to the band pass filter 62k via the switch 62j. The band pass filter 62k passes the first transmission signal in the LTE ultra-high-frequency band amplified by the power amplifier 62i and outputs the signal to the third band pass filter of the multiplexer 63.

When a second transmission signal in the LTE ultra-high-frequency band is transmitted, the switch 62h electrically connects a terminal 62b and the power amplifier 62i to each other. The switch 62j electrically connects the power amplifier 62i and the band pass filter 62l to each other. The power amplifier 62i receives the second transmission signal in the LTE ultra-high-frequency band from the RFIC 101 via the terminal 62b and the switch 62h, amplifies the signal, and outputs the amplified second transmission signal in the LTE ultra-high-frequency band to the band pass filter 62l via the switch 62j. The band pass filter 62l passes the second transmission signal in the LTE ultra-high-frequency band amplified by the power amplifier 62i and outputs the signal to the first band pass filter of the multiplexer 66.

When a first reception signal in the LTE ultra-high-frequency band is received, the switch 62j electrically connects the band pass filter 62k and the low-noise amplifier 62m to each other. The band pass filter 62k receives the first reception signal in the LTE ultra-high-frequency band from the third band pass filter of the multiplexer 63, passes the signal, and outputs the signal to the low-noise amplifier 62m via the switch 62j. The low-noise amplifier 62m amplifies the first reception signal in the LTE ultra-high-frequency band and outputs the amplified first reception signal in the LTE ultra-high-frequency band to the RFIC 101 via a terminal 62c.

When a second reception signal in the LTE ultra-high-frequency band is received, the switch 62j electrically connects the band pass filter 62l and the low-noise amplifier 62n to each other. The band pass filter 62l receives the second reception signal in the LTE ultra-high-frequency band from the first band pass filter of the multiplexer 66, passes the signal, and outputs the signal to the low-noise amplifier 62n via the switch 62j. The low-noise amplifier 62n amplifies the second reception signal in the LTE ultra-high-frequency band and outputs the amplified second reception signal in the LTE ultra-high-frequency band to the RFIC 101 via a terminal 62d.

When a 5GNR signal is transmitted, the switch 62p electrically connects the power amplifier 62o and the band pass filter 62q to each other. The power amplifier 62o receives the 5GNR transmission signal from the RFIC 102 via a terminal 62e, amplifies the signal, and outputs the amplified 5GNR transmission signal to the band pass filter 62q via the switch 62p. The band pass filter 62q passes the 5GNR transmission signal amplified by the power amplifier 62o and outputs the signal to the second band pass filter of the multiplexer 65.

When a first 5GNR reception signal is received, the switch 62p electrically connects the band pass filter 62q and the low-noise amplifier 62s to each other. The band pass filter 62q receives the first 5GNR reception signal from the second band pass filter of the multiplexer 65, passes the signal, and outputs the signal to the low-noise amplifier 62s via the switch 62p. The low-noise amplifier 62s amplifies the first 5GNR reception signal and outputs the amplified first 5GNR reception signal to the RFIC 102 via a terminal 62f.

When a second 5GNR reception signal is received, the switch 62p electrically connects the band pass filter 62r and the low-noise amplifier 62t to each other. The band pass filter 62r receives the second 5GNR reception signal from the second band pass filter of the multiplexer 64, passes the signal, and outputs the signal to the low-noise amplifier 62t via the switch 62p. The low-noise amplifier 62t amplifies the second 5GNR reception signal and outputs the amplified second 5GNR reception signal to the RFIC 102 via a terminal 62g.

The high-frequency-signal transceiver circuit 1G according to the third embodiment achieves the same effects as in the high-frequency-signal transceiver circuit 1 according to the first embodiment and the high-frequency-signal transceiver circuit 1F according to the second embodiment.

The embodiments are described above to make the present disclosure easy to understand and do not limit the present disclosure. The present disclosure can be modified and altered without departing from the spirit thereof. The present disclosure includes equivalents.

While preferred embodiments of the disclosure have been described above, it is to be understood that variations and modifications will be apparent to those skilled in the art without departing from the scope and spirit of the disclosure.

The scope of the disclosure, therefore, is to be determined solely by the following claims.

What is claimed is:

1. A high-frequency-signal transceiver circuit that transmits and receives a signal between first to fourth antenna terminals and terminals connected to a high-frequency circuit, the high-frequency-signal transceiver circuit comprising:
first to fourth circuits, each connected to a corresponding first to fourth antenna terminals,
wherein the first to fourth circuits are each configured to transmit and receive a signal of time division multiplexing communication, a signal of frequency division multiplexing communication, and a signal of multiple-input and multiple-output communication, wherein the third circuit, in the first to fourth circuits, is configured to receive a signal of a satellite positioning system, and wherein a lower limit of a frequency of the signal of the satellite positioning system received by the third circuit and the signal of the time division multiplexing communication, the signal of the frequency division multiplexing communication, or the signal of the multiple-input and the multiple-output communication received by the fourth circuit is higher than the lower limit of the frequency of the signal of the time division multiplexing communication, the signal of the frequency division multiplexing communication, or the signal of the multiple-input and the multiple-output communication, received by each of the first circuit and the second circuit, respectively.

2. The high-frequency-signal transceiver circuit according to claim 1, wherein each of the first to fourth circuits includes one or more power amplifiers configured to amplify the signal transmitted to the first to fourth antenna terminals and one or more low-noise amplifiers configured to amplify the signal received from the first to fourth antenna terminals.

3. The high-frequency-signal transceiver circuit according to claim 2, wherein each of the first to fourth circuits includes a multiplexer configured to electrically connect the first to fourth antenna terminals to the first to fourth circuits.

4. The high-frequency-signal transceiver circuit according to claim 3, wherein each multiplexer of the first to fourth circuits comprises a low pass filter, a high pass filter, and at least a band pass filter.

5. The high-frequency-signal transceiver circuit according to claim 3, wherein at least one multiplexer of the first to fourth circuits comprises a low pass filter, a high pass filter, a first band pass filter, and a second band pass filter.

6. The high-frequency-signal transceiver circuit according to claim 4, wherein each of the first to fourth circuits includes a plurality of switches, each configured to electrically connect one of the power amplifiers or one of the low-noise amplifiers and one of the band pass filters to each other, or one of the band pass filters and one of the high pass filter to each other.

7. The high-frequency-signal transceiver circuit according to claim 1, wherein the first to fourth circuits comprise a single module.

8. A high-frequency-signal transceiver circuit that transmits and receives a signal between first to fourth antenna terminals and terminals connected to a high-frequency circuit, the high-frequency-signal transceiver circuit comprising:

a first circuit configured to transmit and receive a signal of time division multiplexing communication via the first to fourth antenna terminals;

a second circuit configured to receive a signal of a satellite positioning system via the third antenna terminal;

a third circuit configured to transmit and receive a signal of frequency division multiplexing communication via the first antenna terminal;

a fourth circuit configured to transmit and receive the signal of the frequency division multiplexing communication via the first antenna terminal and a second antenna terminal;

a fifth circuit configured to transmit and receive a signal of Carrier Sense Multiple Access with Collision Avoidance ("CSMA/CA") via the third antenna terminal;

a sixth circuit configured to transmit and receive the signal of the time division multiplexing communication and the signal of the frequency division multiplexing communication via the third antenna terminal; and a seventh circuit configured for the CSMA/CA and the time division multiplexing communication via the fourth antenna terminal.

9. The high-frequency-signal transceiver circuit according to claim 8, wherein each of the first circuit and the second circuit includes a multiplexer configured to electrically connect the first to second antenna terminals to the first to second circuits.

10. The high-frequency-signal transceiver circuit according to claim 8, wherein each of the third circuit to seventh circuits includes a multiplexer configured to electrically connect the third to fourth antenna terminals to the third to seventh circuits.

11. The high-frequency-signal transceiver circuit according to claim 9, wherein each multiplexer comprises a low pass filter, a high pass filter, and at least a band pass filter.

12. The high-frequency-signal transceiver circuit according to claim 10, wherein at least one multiplexer comprises a low pass filter, a high pass filter, a first band pass filter, and a second band pass filter.

13. The high-frequency-signal transceiver circuit according to claim 10, wherein at least one multiplexer comprises a low pass filter, a high pass filter and a first to third band pass filters.

14. The high-frequency-signal transceiver circuit according to claim 10, wherein at least one multiplexer comprises a low pass filter, a high pass filter and a first to fourth band pass filters.

15. The high-frequency-signal transceiver circuit according to claim 8, wherein the second circuit includes one or more power amplifiers configured to amplify the signal transmitted to the first to fourth antenna terminals and one or more low-noise amplifiers configured to amplify the signal received from the first to fourth antenna terminals.

* * * * *

UNITED STATES PATENT AND TRADEMARK OFFICE
CERTIFICATE OF CORRECTION

PATENT NO. : 10,615,839 B2
APPLICATION NO. : 16/267691
DATED : April 7, 2020
INVENTOR(S) : Tsuyoshi Sato et al.

Page 1 of 1

It is certified that error appears in the above-identified patent and that said Letters Patent is hereby corrected as shown below:

In the Specification

Column 17, Line 21, "via a tSerminal 41." should read -- via a terminal 41. --

Signed and Sealed this
Twenty-fourth Day of November, 2020

Andrei Iancu
*Director of the United States Patent and Trademark Office*